United States Patent
Lin et al.

(10) Patent No.: US 12,085,687 B2
(45) Date of Patent: Sep. 10, 2024

(54) MODEL-CONSTRAINED MULTI-PHASE VIRTUAL FLOW METERING AND FORECASTING WITH MACHINE LEARNING

(71) Applicant: Saudi Arabian Oil Company, Dhahran (SA)

(72) Inventors: Tao Lin, Katy, TX (US); Weichang Li, Katy, TX (US); Muhammad Arsalan, Dhahran (SA); Abdulla Al Sarraf, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 218 days.

(21) Appl. No.: 17/571,907

(22) Filed: Jan. 10, 2022

(65) Prior Publication Data
US 2023/0221460 A1    Jul. 13, 2023

(51) Int. Cl.
| | |
|---|---|
| G01V 20/00 | (2024.01) |
| G06F 30/27 | (2020.01) |
| G06F 30/28 | (2020.01) |
| G06N 20/00 | (2019.01) |
| G06F 113/08 | (2020.01) |

(52) U.S. Cl.
CPC .............. *G01V 20/00* (2024.01); *G06F 30/27* (2020.01); *G06F 30/28* (2020.01); *G06N 20/00* (2019.01); *G06F 2113/08* (2020.01)

(58) Field of Classification Search
CPC ....... G01V 99/005; G06F 30/27; G06F 30/28; G06F 2113/08; G06N 20/00; E21B 47/10; E21B 41/00; G01F 1/74
See application file for complete search history.

(56) References Cited

U.S. PATENT DOCUMENTS

| | | |
|---|---|---|
| 335,164 A | 2/1886 | Vitalis |
| 646,887 A | 4/1900 | Stowe et al. |
| 1,559,155 A | 10/1925 | Bullock |
| 1,912,452 A | 6/1933 | Hollander |

(Continued)

FOREIGN PATENT DOCUMENTS

| | | |
|---|---|---|
| CA | 1226325 | 9/1987 |
| CA | 2629578 | 10/2009 |

(Continued)

OTHER PUBLICATIONS

English machine translation of WO 2020244684 A1. (Year: 2020).*

(Continued)

*Primary Examiner* — Walter L Lindsay, Jr.
*Assistant Examiner* — Geoffrey T Evans
(74) *Attorney, Agent, or Firm* — Fish & Richardson P.C.

(57) ABSTRACT

A computer-implemented method for constrained multi-phase virtual flow metering and forecasting is described. The method includes predicting instantaneous flow rates and forecasting future target flow rates and well dynamics. The method includes constructing a virtual sensing model trained using forecasted target flow rates and well dynamics. The method includes building a constrained forecasting model by combining unconstrained flow forecasting models, well dynamics models, and virtual sensing models, wherein the constrained forecasting model forecasts multi-phase flow rates.

20 Claims, 10 Drawing Sheets

(56) References Cited

U.S. PATENT DOCUMENTS

| | | |
|---|---|---|
| 1,978,277 A | 10/1934 | Noble |
| 2,287,027 A | 6/1942 | Cummins |
| 2,556,435 A | 6/1951 | Moehrl |
| 2,625,110 A | 1/1953 | Haentjens et al. |
| 2,641,191 A | 6/1953 | Alfred |
| 2,641,922 A | 6/1953 | Smith |
| 2,643,723 A | 6/1953 | Lynes |
| 2,782,720 A | 2/1957 | Dochterman |
| 2,845,869 A | 8/1958 | Herbenar |
| 2,866,417 A | 12/1958 | Otto |
| 2,931,384 A | 4/1960 | Clark |
| 2,959,225 A | 11/1960 | Roberts |
| 3,007,418 A | 11/1961 | Brundage et al. |
| 3,034,484 A | 5/1962 | Stefancin |
| 3,038,698 A | 6/1962 | Troyer |
| 3,123,010 A | 3/1964 | Witt et al. |
| 3,129,875 A | 4/1964 | Cirillo |
| 3,139,835 A | 7/1964 | Wilkinson |
| 3,171,355 A | 3/1965 | Harris et al. |
| 3,175,403 A | 3/1965 | Nelson |
| 3,175,618 A | 3/1965 | Lang et al. |
| 3,251,226 A | 5/1966 | Cushing |
| 3,272,130 A | 9/1966 | Mosbacher |
| 3,413,925 A | 12/1968 | Campolong |
| 3,448,305 A | 6/1969 | Raynal et al. |
| 3,516,765 A | 6/1970 | Boyadjieff |
| 3,558,936 A | 1/1971 | Horan |
| 3,638,732 A | 2/1972 | Huntsinger et al. |
| 3,663,845 A | 5/1972 | Apstein |
| 3,680,989 A | 8/1972 | Brundage |
| 3,724,503 A | 4/1973 | Cooke |
| 3,771,910 A | 11/1973 | Laing |
| 3,795,145 A | 3/1974 | Miller |
| 3,839,914 A | 10/1974 | Modisette et al. |
| 3,874,812 A | 4/1975 | Hanagarth |
| 3,906,792 A | 9/1975 | Miller |
| 3,916,999 A | 11/1975 | Ellis et al. |
| 3,918,520 A | 11/1975 | Hutchison |
| 3,961,758 A | 6/1976 | Morgan |
| 3,970,877 A | 7/1976 | Russell et al. |
| 3,975,117 A | 8/1976 | Carter |
| 4,025,244 A | 5/1977 | Sato |
| 4,051,372 A | 9/1977 | Aine |
| 4,096,211 A | 6/1978 | Rameau |
| 4,139,330 A | 2/1979 | Neal |
| 4,154,302 A | 5/1979 | Cugini |
| 4,181,175 A | 1/1980 | McGee et al. |
| 4,224,687 A | 9/1980 | Claycomb |
| 4,226,275 A | 10/1980 | Frosch |
| 4,266,607 A | 5/1981 | Halstead |
| 4,289,199 A | 9/1981 | McGee |
| 4,336,415 A | 6/1982 | Walling |
| 4,374,530 A | 2/1983 | Walling |
| 4,387,318 A | 6/1983 | Kolm et al. |
| 4,387,685 A | 6/1983 | Abbey |
| 4,417,474 A | 11/1983 | Elderton |
| 4,425,965 A | 1/1984 | Bayh, III et al. |
| 4,440,221 A | 4/1984 | Taylor et al. |
| 4,476,923 A | 10/1984 | Walling |
| 4,491,176 A | 1/1985 | Reed |
| 4,497,185 A | 2/1985 | Shaw |
| 4,536,674 A | 8/1985 | Schmidt |
| 4,576,043 A | 3/1986 | Nguyen |
| 4,580,634 A | 4/1986 | Cruise |
| 4,582,131 A | 4/1986 | Plummer et al. |
| 4,586,854 A | 5/1986 | Newman et al. |
| 4,619,323 A | 10/1986 | Gidley |
| 4,627,489 A | 12/1986 | Reed |
| 4,632,187 A | 12/1986 | Bayh, III et al. |
| 4,658,583 A | 4/1987 | Shropshire |
| 4,662,437 A | 5/1987 | Renfro |
| 4,665,981 A | 5/1987 | Hayatdavoudi |
| 4,685,521 A | 8/1987 | Raulins |
| 4,685,523 A | 8/1987 | Paschal, Jr. et al. |
| 4,741,668 A | 5/1988 | Bearden et al. |
| 4,757,709 A | 7/1988 | Czernichow |
| RE32,866 E | 2/1989 | Cruise |
| 4,838,758 A | 6/1989 | Sheth |
| 4,850,812 A | 7/1989 | Voight |
| 4,856,344 A | 8/1989 | Hunt |
| 4,867,633 A | 9/1989 | Gravelle |
| 4,969,364 A | 11/1990 | Masuda |
| 4,986,739 A | 1/1991 | Child |
| 5,033,937 A | 7/1991 | Wilson |
| 5,094,294 A | 3/1992 | Bayh, III et al. |
| 5,113,379 A | 5/1992 | Scherbatskoy |
| 5,150,619 A | 9/1992 | Turner |
| 5,158,440 A | 10/1992 | Cooper et al. |
| 5,169,286 A | 12/1992 | Yamada |
| 5,180,014 A | 1/1993 | Cox |
| 5,195,882 A | 3/1993 | Freeman |
| 5,201,848 A | 4/1993 | Powers |
| 5,209,650 A | 5/1993 | Lemieux |
| 5,215,151 A | 6/1993 | Smith |
| 5,224,182 A | 6/1993 | Murphy et al. |
| 5,261,796 A | 11/1993 | Niemiec et al. |
| 5,269,377 A | 12/1993 | Martin |
| 5,285,008 A | 2/1994 | Sas-Jaworsky et al. |
| 5,287,328 A | 2/1994 | Anderson et al. |
| 5,301,760 A | 4/1994 | Graham |
| 5,317,223 A | 5/1994 | Kiesewetter et al. |
| 5,323,661 A | 6/1994 | Cheng |
| 5,334,801 A | 8/1994 | Mohn |
| 5,335,542 A | 8/1994 | Ramakrishnan et al. |
| 5,337,603 A | 8/1994 | McFarland et al. |
| 5,350,018 A | 9/1994 | Sorem et al. |
| 5,358,378 A | 10/1994 | Holscher |
| 5,375,622 A | 12/1994 | Houston |
| 5,482,117 A | 1/1996 | Kolpak |
| 5,494,413 A | 2/1996 | Campen et al. |
| 5,503,228 A | 4/1996 | Anderson |
| 5,566,762 A | 10/1996 | Braddick et al. |
| 5,591,922 A | 1/1997 | Segeral et al. |
| 5,605,193 A | 2/1997 | Bearden et al. |
| 5,613,311 A | 3/1997 | Burtch |
| 5,613,555 A | 3/1997 | Sorem et al. |
| 5,620,048 A | 4/1997 | Beauquin |
| 5,641,915 A | 6/1997 | Ortiz |
| 5,649,811 A | 7/1997 | Krol, Jr. et al. |
| 5,653,585 A | 8/1997 | Fresco et al. |
| 5,693,891 A | 12/1997 | Brown |
| 5,708,500 A | 1/1998 | Anderson |
| 5,736,650 A | 4/1998 | Hiron et al. |
| 5,738,173 A | 4/1998 | Burge |
| 5,755,288 A | 5/1998 | Bearden et al. |
| 5,834,659 A | 11/1998 | Ortiz |
| 5,845,709 A | 12/1998 | Mack et al. |
| 5,848,642 A | 12/1998 | Sola |
| 5,880,378 A | 3/1999 | Behring |
| 5,886,267 A | 3/1999 | Ortiz et al. |
| 5,892,860 A | 4/1999 | Maron et al. |
| 5,905,208 A | 5/1999 | Ortiz et al. |
| 5,908,049 A | 6/1999 | Williams et al. |
| 5,921,285 A | 7/1999 | Quigley et al. |
| 5,954,305 A | 9/1999 | Calabro |
| 5,965,964 A | 10/1999 | Skinner et al. |
| 5,975,205 A | 11/1999 | Carisella |
| 6,044,906 A | 4/2000 | Saltel |
| 6,068,015 A | 5/2000 | Pringle |
| 6,082,455 A | 7/2000 | Pringle et al. |
| 6,113,675 A | 9/2000 | Branstetter |
| 6,129,507 A | 10/2000 | Ganelin |
| 6,148,866 A | 11/2000 | Quigley et al. |
| 6,155,102 A | 12/2000 | Toma |
| 6,164,308 A | 12/2000 | Butler |
| 6,167,965 B1 | 1/2001 | Bearden et al. |
| 6,176,323 B1 | 1/2001 | Weirich |
| 6,179,269 B1 | 1/2001 | Kobylinski et al. |
| 6,192,983 B1 | 2/2001 | Neuroth et al. |
| 6,193,079 B1 | 2/2001 | Weimer |
| 6,209,652 B1 | 4/2001 | Portman et al. |
| 6,257,332 B1 | 7/2001 | Vidrine et al. |
| 6,264,440 B1 | 7/2001 | Klein et al. |
| 6,285,446 B1 | 9/2001 | Farhadiroushan et al. |

(56) References Cited

U.S. PATENT DOCUMENTS

| | | |
|---|---|---|
| 6,286,558 B1 | 9/2001 | Quigley et al. |
| 6,289,990 B1 | 9/2001 | Dillon et al. |
| 6,298,917 B1 | 10/2001 | Kobylinski et al. |
| 6,325,143 B1 | 12/2001 | Scarsdale |
| 6,357,485 B2 | 3/2002 | Quigley et al. |
| 6,361,272 B1 | 3/2002 | Bassett |
| 6,413,065 B1 | 7/2002 | Dass |
| 6,414,239 B1 | 7/2002 | Gasque, Jr. |
| 6,427,778 B1 | 8/2002 | Beall et al. |
| 6,454,010 B1 | 9/2002 | Thomas et al. |
| 6,463,810 B1 | 10/2002 | Liu |
| 6,504,258 B2 | 1/2003 | Schultz et al. |
| 6,530,211 B2 | 3/2003 | Holtzapple et al. |
| 6,544,013 B2 | 4/2003 | Kato et al. |
| 6,546,812 B2 | 4/2003 | Lewis |
| 6,547,519 B2 | 4/2003 | deBlanc et al. |
| 6,550,327 B1 | 4/2003 | Van Berk |
| 6,557,642 B2 | 5/2003 | Head |
| 6,578,638 B2 | 6/2003 | Guillory et al. |
| 6,588,266 B2 | 7/2003 | Tubel et al. |
| 6,597,446 B2 | 7/2003 | Klooster et al. |
| 6,601,460 B1 | 8/2003 | Materna |
| 6,601,651 B2 | 8/2003 | Grant |
| 6,604,550 B2 | 8/2003 | Quigley et al. |
| 6,629,564 B1 | 10/2003 | Ramakrishnan et al. |
| 6,640,898 B2 | 11/2003 | Lord et al. |
| 6,655,221 B1 | 12/2003 | Aspelund et al. |
| 6,679,692 B1 | 1/2004 | Feuling et al. |
| 6,681,894 B1 | 1/2004 | Fanguy |
| 6,726,449 B2 | 4/2004 | James et al. |
| 6,728,165 B1 | 4/2004 | Roscigno et al. |
| 6,733,249 B2 | 5/2004 | Maier et al. |
| 6,741,000 B2 | 5/2004 | Newcomb |
| 6,755,609 B2 | 6/2004 | Preinfalk |
| 6,768,214 B2 | 7/2004 | Schultz et al. |
| 6,776,054 B1 | 8/2004 | Stephenson |
| 6,779,601 B2 | 8/2004 | Wilson |
| 6,807,857 B2 | 10/2004 | Storm, Jr. |
| 6,808,371 B2 | 10/2004 | Niwatsukino et al. |
| 6,811,382 B2 | 11/2004 | Buchanan et al. |
| 6,848,539 B2 | 2/2005 | Lee et al. |
| 6,856,132 B2 | 2/2005 | Appel et al. |
| 6,857,452 B2 | 2/2005 | Quigley et al. |
| 6,857,920 B2 | 2/2005 | Marathe et al. |
| 6,863,137 B2 | 3/2005 | Terry et al. |
| 6,913,079 B2 | 7/2005 | Tubel |
| 6,915,707 B2 | 7/2005 | Nyfors et al. |
| 6,920,085 B2 | 7/2005 | Finke et al. |
| 6,935,189 B2 | 8/2005 | Richards |
| 6,982,928 B2 | 1/2006 | Al-Ali |
| 6,993,979 B2 | 2/2006 | Segeral |
| 7,017,681 B2 | 3/2006 | Ivannikov et al. |
| 7,021,905 B2 | 4/2006 | Torrey et al. |
| 7,032,662 B2 | 4/2006 | Malone et al. |
| 7,086,294 B2 | 8/2006 | DeLong |
| 7,086,481 B2 | 8/2006 | Hosie |
| 7,093,665 B2 | 8/2006 | Dass |
| 7,107,860 B2 | 9/2006 | Jones |
| 7,199,480 B2 | 4/2007 | Fripp et al. |
| 7,224,077 B2 | 5/2007 | Allen |
| 7,226,279 B2 | 6/2007 | Andoskin et al. |
| 7,242,103 B2 | 7/2007 | Tips |
| 7,249,805 B2 | 7/2007 | Cap |
| 7,259,688 B2 | 8/2007 | Hirsch et al. |
| 7,262,532 B2 | 8/2007 | Seidler et al. |
| 7,275,592 B2 | 10/2007 | Davis |
| 7,275,711 B1 | 10/2007 | Flanigan |
| 7,293,471 B2 | 11/2007 | Bo et al. |
| 7,317,989 B2 | 1/2008 | DiFoggio |
| 7,338,262 B2 | 3/2008 | Gozdawa |
| 7,345,372 B2 | 3/2008 | Roberts et al. |
| 7,347,261 B2 | 3/2008 | Markel |
| 7,377,312 B2 | 5/2008 | Davis |
| 7,387,021 B2 | 6/2008 | DiFoggio |
| 7,410,003 B2 | 8/2008 | Ravensbergen et al. |
| 7,520,158 B2 | 4/2009 | DiFoggio |
| 7,616,524 B1 | 11/2009 | Gersztenkorn |
| 7,647,948 B2 | 1/2010 | Quigley et al. |
| 7,668,411 B2 | 2/2010 | Davies et al. |
| 7,670,122 B2 | 3/2010 | Phillips et al. |
| 7,670,451 B2 | 3/2010 | Head |
| 7,699,099 B2 | 4/2010 | Bolding et al. |
| 7,719,676 B2 | 5/2010 | DiFoggio |
| 7,730,937 B2 | 6/2010 | Head |
| 7,762,715 B2 | 7/2010 | Gordon et al. |
| 7,770,469 B2 | 8/2010 | Nyfors et al. |
| 7,770,650 B2 | 8/2010 | Young et al. |
| 7,775,763 B1 | 8/2010 | Johnson et al. |
| 7,819,640 B2 | 10/2010 | Kalavsky et al. |
| 7,841,395 B2 | 11/2010 | Gay et al. |
| 7,841,826 B1 | 11/2010 | Phillips |
| 7,847,421 B2 | 12/2010 | Gardner et al. |
| 7,849,928 B2 | 12/2010 | Collie |
| 7,857,055 B2 | 12/2010 | Li |
| 7,905,295 B2 | 3/2011 | Mack |
| 7,906,861 B2 | 3/2011 | Guerrero et al. |
| 7,908,230 B2 | 3/2011 | Bailey et al. |
| 7,946,341 B2 | 5/2011 | Hartog et al. |
| 8,013,660 B2 | 9/2011 | Fitzi |
| 8,016,545 B2 | 9/2011 | Oklejas et al. |
| 8,047,232 B2 | 11/2011 | Bernitsas |
| 8,066,033 B2 | 11/2011 | Quigley et al. |
| 8,067,865 B2 | 11/2011 | Savant |
| 8,098,376 B2 | 1/2012 | So et al. |
| 8,197,602 B2 | 6/2012 | Baron |
| 8,204,727 B2 | 6/2012 | Dean et al. |
| 8,235,126 B2 | 8/2012 | Bradley |
| 8,258,644 B2 | 9/2012 | Kaplan |
| 8,261,841 B2 | 9/2012 | Bailey et al. |
| 8,302,736 B1 | 11/2012 | Olivier |
| 8,334,980 B2 | 12/2012 | So et al. |
| 8,337,142 B2 | 12/2012 | Eslinger et al. |
| 8,359,904 B2 | 1/2013 | Nicoletti et al. |
| 8,408,064 B2 | 4/2013 | Hartog et al. |
| 8,419,398 B2 | 4/2013 | Kothnur et al. |
| 8,421,251 B2 | 4/2013 | Pabon et al. |
| 8,426,988 B2 | 4/2013 | Hay |
| 8,493,556 B2 | 7/2013 | Li et al. |
| 8,506,257 B2 | 8/2013 | Bottome |
| 8,510,242 B2 | 8/2013 | Al-Fattah et al. |
| 8,564,179 B2 | 10/2013 | Ochoa et al. |
| 8,568,081 B2 | 10/2013 | Song et al. |
| 8,570,050 B2 | 10/2013 | Nyfors et al. |
| 8,579,617 B2 | 11/2013 | Ono et al. |
| 8,604,634 B2 | 12/2013 | Pabon et al. |
| 8,638,002 B2 | 1/2014 | Lu |
| 8,648,480 B1 | 2/2014 | Liu et al. |
| 8,771,499 B2 | 7/2014 | McCutchen et al. |
| 8,786,113 B2 | 7/2014 | Tinnen et al. |
| 8,821,138 B2 | 9/2014 | Holtzapple et al. |
| 8,826,973 B2 | 9/2014 | Moxley et al. |
| 8,851,192 B2 | 10/2014 | Deible |
| 8,905,728 B2 | 12/2014 | Blankemeier et al. |
| 8,916,983 B2 | 12/2014 | Marya et al. |
| 8,925,649 B1 | 1/2015 | Wiebe et al. |
| 8,936,430 B2 | 1/2015 | Bassett |
| 8,948,550 B2 | 2/2015 | Li et al. |
| 8,950,476 B2 | 2/2015 | Head |
| 8,960,309 B2 | 2/2015 | Davis |
| 8,973,433 B2 | 3/2015 | Mulford |
| 9,080,336 B1 | 7/2015 | Yantis |
| 9,091,144 B2 | 7/2015 | Swanson et al. |
| 9,091,161 B2 | 7/2015 | Brannon |
| 9,106,159 B1 | 8/2015 | Wiebe et al. |
| 9,109,429 B2 | 8/2015 | Xu et al. |
| 9,130,161 B2 | 9/2015 | Nair et al. |
| 9,133,709 B2 | 9/2015 | Huh et al. |
| 9,140,815 B2 | 9/2015 | Lopez et al. |
| 9,157,297 B2 | 10/2015 | Williamson, Jr. |
| 9,170,149 B2 | 10/2015 | Hartog et al. |
| 9,200,932 B2 | 12/2015 | Sittler |
| 9,203,277 B2 | 12/2015 | Kori et al. |
| 9,234,529 B2 | 1/2016 | Meuter |
| 9,239,043 B1 | 1/2016 | Zeas |

(56) References Cited

U.S. PATENT DOCUMENTS

| | | |
|---|---|---|
| 9,321,222 B2 | 4/2016 | Childers et al. |
| 9,322,389 B2 | 4/2016 | Tosi |
| 9,353,614 B2 | 5/2016 | Roth et al. |
| 9,383,476 B2 | 7/2016 | Trehan |
| 9,499,460 B2 | 11/2016 | Kawamura et al. |
| 9,500,073 B2 | 11/2016 | Alan et al. |
| 9,540,908 B1 | 1/2017 | Olivier |
| 9,574,438 B2 | 2/2017 | Flores |
| 9,581,489 B2 | 2/2017 | Skinner |
| 9,587,456 B2 | 3/2017 | Roth |
| 9,593,561 B2 | 3/2017 | Xiao et al. |
| 9,599,460 B2 | 3/2017 | Wang et al. |
| 9,599,505 B2 | 3/2017 | Lagakos et al. |
| 9,617,847 B2 | 4/2017 | Jaaskelainen et al. |
| 9,631,482 B2 | 4/2017 | Roth et al. |
| 9,677,560 B1 | 6/2017 | Davis et al. |
| 9,696,283 B1 | 7/2017 | Yu |
| 9,757,796 B2 | 9/2017 | Sherman et al. |
| 9,759,025 B2 | 9/2017 | Vavik |
| 9,759,041 B2 | 9/2017 | Osborne |
| 9,784,077 B2 | 10/2017 | Gorrara |
| 9,880,096 B2 | 1/2018 | Bond et al. |
| 9,903,010 B2 | 2/2018 | Doud et al. |
| 9,903,172 B2 | 2/2018 | Hansen |
| 9,915,134 B2 | 3/2018 | Xiao et al. |
| 9,932,806 B2 | 4/2018 | Stewart |
| 9,951,598 B2 | 4/2018 | Roth et al. |
| 9,964,533 B2 | 5/2018 | Ahmad |
| 9,976,381 B2 | 5/2018 | Martin et al. |
| 9,982,519 B2 | 5/2018 | Melo |
| 10,012,758 B2 | 7/2018 | Speck et al. |
| 10,067,255 B2 | 9/2018 | Colombo et al. |
| 10,100,596 B2 | 10/2018 | Roth et al. |
| 10,115,942 B2 | 10/2018 | Qiao et al. |
| 10,138,885 B2 | 11/2018 | Ejim et al. |
| 10,151,194 B2 | 12/2018 | Roth et al. |
| 10,209,383 B2 | 2/2019 | Barfoot et al. |
| 10,253,610 B2 | 4/2019 | Roth et al. |
| 10,273,399 B2 | 4/2019 | Cox et al. |
| 10,287,853 B2 | 5/2019 | Ejim et al. |
| 10,308,865 B2 | 6/2019 | Cox et al. |
| 10,323,644 B1 | 6/2019 | Shakirov et al. |
| 10,337,302 B2 | 7/2019 | Roth et al. |
| 10,337,312 B2 | 7/2019 | Xiao et al. |
| 10,345,468 B2 | 7/2019 | Poole |
| 10,352,125 B2 | 7/2019 | Frazier |
| 10,367,434 B2 | 7/2019 | Ahmad |
| 10,378,322 B2 | 8/2019 | Ejim et al. |
| 10,386,519 B2 | 8/2019 | Colombo et al. |
| 10,465,477 B2 | 11/2019 | Abdelaziz et al. |
| 10,465,484 B2 | 11/2019 | Turner et al. |
| 10,487,259 B2 | 11/2019 | Cox et al. |
| 10,501,682 B2 | 12/2019 | Cox et al. |
| 10,533,558 B2 | 1/2020 | Melo et al. |
| 10,578,111 B2 | 3/2020 | Xiao et al. |
| 10,634,553 B1 | 4/2020 | Hveding et al. |
| 10,724,312 B2 | 7/2020 | Zsolt |
| 10,844,672 B2 | 11/2020 | Dziekonski |
| 10,845,494 B2 | 11/2020 | Zhao et al. |
| 10,852,450 B2 | 12/2020 | Colombo et al. |
| 10,920,585 B2 | 2/2021 | Colombo et al. |
| 10,934,814 B2 | 3/2021 | Arsalan et al. |
| 10,962,408 B2 | 3/2021 | Hveding et al. |
| 11,028,673 B2 | 6/2021 | Arsalan et al. |
| 11,092,709 B2 | 8/2021 | Zhao et al. |
| 11,209,307 B2 | 12/2021 | Hveding et al. |
| 11,242,731 B2 | 2/2022 | Arsalan et al. |
| 11,243,322 B2 | 2/2022 | Li |
| 2001/0036334 A1 | 11/2001 | Choa |
| 2002/0043404 A1 | 4/2002 | Trueman et al. |
| 2002/0074742 A1 | 6/2002 | Quoiani |
| 2002/0079100 A1 | 6/2002 | Simpson |
| 2002/0109080 A1 | 8/2002 | Tubel et al. |
| 2002/0121376 A1 | 9/2002 | Rivas |
| 2002/0153141 A1 | 10/2002 | Hartman |
| 2003/0024738 A1 | 2/2003 | Schuh |
| 2003/0079880 A1 | 5/2003 | Deaton et al. |
| 2003/0141071 A1 | 7/2003 | Hosie |
| 2003/0161739 A1 | 8/2003 | Chu et al. |
| 2003/0185676 A1 | 10/2003 | James |
| 2003/0226395 A1 | 12/2003 | Storm et al. |
| 2004/0060705 A1 | 4/2004 | Kelley |
| 2005/0047779 A1 | 3/2005 | Jaynes et al. |
| 2005/0098349 A1 | 5/2005 | Krueger et al. |
| 2005/0166961 A1 | 8/2005 | Means |
| 2005/0177349 A1 | 8/2005 | Lu |
| 2005/0217859 A1 | 10/2005 | Hartman |
| 2005/0274527 A1 | 12/2005 | Misselbrook |
| 2006/0012785 A1 | 1/2006 | Funk et al. |
| 2006/0076956 A1 | 4/2006 | Sjolie et al. |
| 2006/0086498 A1 | 4/2006 | Wetzel et al. |
| 2006/0096760 A1 | 5/2006 | Ohmer |
| 2006/0266108 A1 | 11/2006 | DiFoggio |
| 2006/0266109 A1 | 11/2006 | Difoggio |
| 2007/0012437 A1 | 1/2007 | Clingman et al. |
| 2007/0064531 A1 | 3/2007 | DuBose |
| 2007/0181304 A1 | 8/2007 | Rankin et al. |
| 2007/0193749 A1 | 8/2007 | Folk |
| 2007/0220987 A1 | 9/2007 | Clifton et al. |
| 2008/0048455 A1 | 2/2008 | Carney |
| 2008/0093084 A1 | 4/2008 | Knight |
| 2008/0100828 A1 | 5/2008 | Cyr et al. |
| 2008/0111064 A1 | 5/2008 | Andrews et al. |
| 2008/0187434 A1 | 8/2008 | Neiszer |
| 2008/0236842 A1 | 10/2008 | Bhavsar et al. |
| 2008/0262737 A1 | 10/2008 | Thigpen et al. |
| 2008/0264182 A1 | 10/2008 | Jones |
| 2008/0277941 A1 | 11/2008 | Bowles |
| 2008/0290876 A1 | 11/2008 | Ameen |
| 2008/0292454 A1 | 11/2008 | Brunner |
| 2008/0296067 A1 | 12/2008 | Haughom |
| 2009/0001304 A1 | 1/2009 | Hansen et al. |
| 2009/0016899 A1 | 1/2009 | Davis |
| 2009/0027677 A1 | 1/2009 | Willing et al. |
| 2009/0090513 A1 | 4/2009 | Bissonnette |
| 2009/0107725 A1 | 4/2009 | Christy et al. |
| 2009/0110579 A1 | 4/2009 | Amburgey |
| 2009/0151928 A1 | 6/2009 | Lawson |
| 2009/0151953 A1 | 6/2009 | Brown |
| 2009/0166045 A1 | 7/2009 | Wetzel et al. |
| 2009/0255669 A1 | 10/2009 | Ayan et al. |
| 2009/0304322 A1 | 10/2009 | Davies et al. |
| 2009/0289627 A1 | 11/2009 | Johansen et al. |
| 2009/0293634 A1 | 12/2009 | Ong |
| 2010/0011836 A1 | 1/2010 | Kalkman |
| 2010/0040492 A1 | 2/2010 | Eslinger et al. |
| 2010/0044103 A1 | 2/2010 | Moxley et al. |
| 2010/0122818 A1 | 5/2010 | Rooks |
| 2010/0164231 A1 | 7/2010 | Tsou |
| 2010/0206420 A1 | 8/2010 | Jakobsen |
| 2010/0206577 A1 | 8/2010 | Martinez |
| 2010/0236794 A1 | 9/2010 | Duan |
| 2010/0244404 A1 | 9/2010 | Bradley |
| 2010/0258306 A1 | 10/2010 | Camilleri |
| 2010/0288493 A1 | 11/2010 | Fielder et al. |
| 2010/0300413 A1 | 12/2010 | Ulrey et al. |
| 2010/0308592 A1 | 12/2010 | Frayne |
| 2010/0312529 A1 | 12/2010 | Souche |
| 2011/0017459 A1 | 1/2011 | Dinkins |
| 2011/0024107 A1 | 2/2011 | Sunyovszky et al. |
| 2011/0024231 A1 | 2/2011 | Wurth et al. |
| 2011/0036568 A1 | 2/2011 | Barbosa |
| 2011/0036662 A1 | 2/2011 | Smith |
| 2011/0049901 A1 | 3/2011 | Tinnen |
| 2011/0069581 A1 | 3/2011 | Krohn |
| 2011/0072886 A1 | 3/2011 | Caneau |
| 2011/0088025 A1 | 4/2011 | Samson et al. |
| 2011/0155390 A1 | 6/2011 | Lannom et al. |
| 2011/0162832 A1 | 7/2011 | Reid |
| 2011/0185805 A1 | 8/2011 | Roux et al. |
| 2011/0203848 A1 | 8/2011 | Krueger et al. |
| 2011/0213556 A1 | 9/2011 | Yu et al. |
| 2011/0259120 A1 | 10/2011 | Thonstad |
| 2011/0273032 A1 | 11/2011 | Lu |

(56) References Cited

U.S. PATENT DOCUMENTS

| | | |
|---|---|---|
| 2011/0278094 A1 | 11/2011 | Gute |
| 2011/0296911 A1 | 12/2011 | Moore |
| 2011/0300008 A1 | 12/2011 | Fielder et al. |
| 2012/0012327 A1 | 1/2012 | Plunkett et al. |
| 2012/0018143 A1 | 1/2012 | Lembcke |
| 2012/0048618 A1 | 3/2012 | Zamanian et al. |
| 2012/0060615 A1 | 3/2012 | Farhadiroushan et al. |
| 2012/0151994 A1 | 6/2012 | Hung |
| 2012/0210796 A1 | 8/2012 | Schade |
| 2012/0211245 A1 | 8/2012 | Fuhst et al. |
| 2012/0282119 A1 | 11/2012 | Floyd |
| 2012/0292915 A1 | 11/2012 | Moon |
| 2013/0019673 A1 | 1/2013 | Sroka |
| 2013/0300833 A1 | 1/2013 | Perkins |
| 2013/0033961 A1 | 2/2013 | Burnstad |
| 2013/0048302 A1 | 2/2013 | Gokdag et al. |
| 2013/0051977 A1 | 2/2013 | Song |
| 2013/0066139 A1 | 3/2013 | Wiessler |
| 2013/0068454 A1 | 3/2013 | Armistead |
| 2013/0068481 A1 | 3/2013 | Zhou |
| 2013/0073208 A1 | 3/2013 | Dorovsky |
| 2013/0081460 A1 | 4/2013 | Xiao et al. |
| 2013/0091942 A1 | 4/2013 | Samson et al. |
| 2013/0119669 A1 | 5/2013 | Murphree |
| 2013/0140031 A1 | 6/2013 | Cohen et al. |
| 2013/0167628 A1 | 7/2013 | Hull et al. |
| 2013/0175030 A1 | 7/2013 | Ige |
| 2013/0189123 A1 | 7/2013 | Stokley |
| 2013/0194893 A1 | 8/2013 | Nagarajappa |
| 2013/0200628 A1 | 8/2013 | Kane |
| 2013/0213663 A1 | 8/2013 | Lau et al. |
| 2013/0227940 A1 | 9/2013 | Greenblatt |
| 2013/0248429 A1 | 9/2013 | Dahule |
| 2013/0255370 A1 | 10/2013 | Roux et al. |
| 2013/0259721 A1 | 10/2013 | Noui-Mehidi |
| 2013/0336091 A1 | 12/2013 | Song et al. |
| 2014/0012507 A1 | 1/2014 | Trehan |
| 2014/0014331 A1 | 1/2014 | Crocker |
| 2014/0027546 A1 | 1/2014 | Kean et al. |
| 2014/0037422 A1 | 2/2014 | Gilarranz |
| 2014/0041862 A1 | 2/2014 | Ersoz |
| 2014/0076547 A1 | 3/2014 | Unalmis et al. |
| 2014/0116720 A1 | 5/2014 | He et al. |
| 2014/0138528 A1 | 5/2014 | Pope et al. |
| 2014/0144706 A1 | 5/2014 | Bailey et al. |
| 2014/0167418 A1 | 6/2014 | Hiejima |
| 2014/0175800 A1 | 6/2014 | Thorp |
| 2014/0195215 A1 | 7/2014 | Chen et al. |
| 2014/0208855 A1 | 7/2014 | Skinner |
| 2014/0209291 A1 | 7/2014 | Watson et al. |
| 2014/0240951 A1 | 8/2014 | Brady et al. |
| 2014/0265337 A1 | 9/2014 | Harding et al. |
| 2014/0284937 A1 | 9/2014 | Dudley et al. |
| 2014/0288838 A1 | 9/2014 | Trickett |
| 2014/0311737 A1 | 10/2014 | Bedouet et al. |
| 2014/0341714 A1 | 11/2014 | Casa |
| 2014/0343857 A1 | 11/2014 | Pfutzner |
| 2014/0365135 A1 | 12/2014 | Poole |
| 2014/0377080 A1 | 12/2014 | Xiao et al. |
| 2015/0034580 A1 | 2/2015 | Nakao et al. |
| 2015/0060083 A1 | 3/2015 | Romer et al. |
| 2015/0068769 A1 | 3/2015 | Xiao et al. |
| 2015/0071795 A1 | 3/2015 | Vazquez et al. |
| 2015/0114127 A1 | 4/2015 | Barfoot et al. |
| 2015/0177300 A1 | 6/2015 | Paech |
| 2015/0192141 A1 | 7/2015 | Nowitzki et al. |
| 2015/0233228 A1 | 8/2015 | Roth |
| 2015/0308245 A1 | 10/2015 | Stewart et al. |
| 2015/0308444 A1 | 10/2015 | Trottman |
| 2015/0316674 A1 | 11/2015 | Deschizeaux et al. |
| 2015/0318920 A1 | 11/2015 | Johnston |
| 2015/0330194 A1 | 11/2015 | June et al. |
| 2015/0354308 A1 | 12/2015 | June et al. |
| 2015/0354590 A1 | 12/2015 | Kao |
| 2015/0369029 A1 | 12/2015 | Potapenko |
| 2015/0376907 A1 | 12/2015 | Nguyen |
| 2016/0010451 A1 | 1/2016 | Melo |
| 2016/0016834 A1 | 1/2016 | Dahule |
| 2016/0018985 A1 | 1/2016 | Bennet et al. |
| 2016/0040518 A1 | 2/2016 | Potapenko |
| 2016/0054285 A1 | 2/2016 | Freese |
| 2016/0139085 A1 | 5/2016 | Pelletier et al. |
| 2016/0168957 A1 | 6/2016 | Tubel |
| 2016/0169231 A1 | 6/2016 | Michelassi et al. |
| 2016/0177659 A1 | 6/2016 | Voll et al. |
| 2016/0187513 A1 | 6/2016 | Poole et al. |
| 2016/0202142 A1 | 7/2016 | Wang et al. |
| 2016/0273947 A1 | 9/2016 | Mu et al. |
| 2016/0305447 A1 | 10/2016 | Dreiss et al. |
| 2016/0320509 A1 | 11/2016 | Almuhaidib |
| 2016/0332856 A1 | 11/2016 | Steedley |
| 2016/0341834 A1 | 11/2016 | Bartetzko |
| 2017/0030819 A1 | 2/2017 | Mccarty et al. |
| 2017/0033713 A1 | 2/2017 | Petroni |
| 2017/0038246 A1 | 2/2017 | Coates et al. |
| 2017/0038294 A1 | 2/2017 | Kshirsagar |
| 2017/0058664 A1 | 3/2017 | Xiao et al. |
| 2017/0074082 A1 | 3/2017 | Palmer |
| 2017/0075029 A1 | 3/2017 | Cuny et al. |
| 2017/0122046 A1 | 5/2017 | Vavik |
| 2017/0137699 A1 | 5/2017 | Song et al. |
| 2017/0138189 A1 | 5/2017 | Ahmad et al. |
| 2017/0159668 A1 | 6/2017 | Nowitzki et al. |
| 2017/0167498 A1 | 6/2017 | Chang |
| 2017/0175752 A1 | 6/2017 | Hofer et al. |
| 2017/0183942 A1 | 6/2017 | Veland |
| 2017/0193361 A1 | 7/2017 | Chilimbi et al. |
| 2017/0194831 A1 | 7/2017 | Marvel |
| 2017/0211372 A1 | 7/2017 | Samuel |
| 2017/0235006 A1 | 8/2017 | Ellmauthaler et al. |
| 2017/0241251 A1 | 8/2017 | Rodrigues et al. |
| 2017/0260846 A1 | 9/2017 | Jin et al. |
| 2017/0292533 A1 | 10/2017 | Zia |
| 2017/0321695 A1 | 11/2017 | Head |
| 2017/0328151 A1 | 11/2017 | Dillard |
| 2017/0370197 A1 | 12/2017 | Han et al. |
| 2018/0011033 A1 | 1/2018 | Karimi et al. |
| 2018/0045543 A1 | 2/2018 | Farhadiroushan et al. |
| 2018/0052041 A1 | 2/2018 | Yaman et al. |
| 2018/0058157 A1 | 3/2018 | Melo et al. |
| 2018/0066671 A1 | 3/2018 | Murugan |
| 2018/0128661 A1 | 5/2018 | Munro |
| 2018/0134036 A1 | 5/2018 | Galtarossa et al. |
| 2018/0136353 A1 | 5/2018 | Zhao et al. |
| 2018/0155991 A1 | 6/2018 | Arsalan et al. |
| 2018/0156030 A1 | 6/2018 | Arsalan et al. |
| 2018/0156600 A1 | 6/2018 | Cable et al. |
| 2018/0171763 A1 | 6/2018 | Malbrel et al. |
| 2018/0171767 A1 | 6/2018 | Huynh et al. |
| 2018/0172020 A1 | 6/2018 | Ejim |
| 2018/0202843 A1 | 7/2018 | Artuso et al. |
| 2018/0209253 A1 | 7/2018 | Westberg |
| 2018/0226174 A1 | 8/2018 | Rose |
| 2018/0238152 A1 | 8/2018 | Melo |
| 2018/0274311 A1 | 9/2018 | Zsolt |
| 2018/0284304 A1 | 10/2018 | Barfoot et al. |
| 2018/0306199 A1 | 10/2018 | Reed |
| 2018/0320059 A1 | 11/2018 | Cox et al. |
| 2018/0321405 A1 | 11/2018 | Colombo et al. |
| 2018/0340389 A1 | 11/2018 | Wang |
| 2018/0351480 A1 | 12/2018 | Ahmad |
| 2018/0355707 A1 | 12/2018 | Herrera et al. |
| 2018/0363660 A1 | 12/2018 | Klahn |
| 2019/0025095 A1 | 1/2019 | Steel |
| 2019/0032667 A1 | 1/2019 | Ifrim et al. |
| 2019/0040863 A1 | 2/2019 | Davis et al. |
| 2019/0049054 A1 | 2/2019 | Gunnarsson |
| 2019/0055792 A1 | 2/2019 | Sui et al. |
| 2019/0072379 A1 | 3/2019 | Jalilian et al. |
| 2019/0078427 A1 | 3/2019 | Gillan |
| 2019/0128113 A1 | 5/2019 | Ross et al. |
| 2019/0253003 A1 | 8/2019 | Ahmad |
| 2019/0253004 A1 | 8/2019 | Ahmad |
| 2019/0253005 A1 | 8/2019 | Ahmad |

(56) References Cited

U.S. PATENT DOCUMENTS

| | | |
|---|---|---|
| 2019/0253006 A1 | 8/2019 | Ahmad |
| 2019/0271217 A1 | 9/2019 | Radov et al. |
| 2019/0368291 A1 | 12/2019 | Xiao et al. |
| 2019/0376371 A1 | 12/2019 | Arsalan |
| 2020/0018149 A1 | 1/2020 | Luo et al. |
| 2020/0056462 A1 | 2/2020 | Xiao et al. |
| 2020/0056615 A1 | 2/2020 | Xiao et al. |
| 2020/0134773 A1 | 4/2020 | Pinter et al. |
| 2020/0182024 A1 | 6/2020 | Arsalan et al. |
| 2020/0319108 A1 | 10/2020 | Butte et al. |
| 2020/0386080 A1 | 12/2020 | Xu |
| 2021/0095557 A1 | 4/2021 | Xu et al. |
| 2021/0190983 A1 | 6/2021 | Colombo et al. |
| 2021/0264262 A1 | 8/2021 | Colombo et al. |
| 2021/0340849 A1 | 11/2021 | Arsalan et al. |
| 2021/0404849 A1* | 12/2021 | Xie .......................... G01F 1/74 |
| 2022/0074304 A1 | 3/2022 | Mahalingam et al. |
| 2022/0074767 A1 | 3/2022 | Mahalingam et al. |

FOREIGN PATENT DOCUMENTS

| | | |
|---|---|---|
| CN | 2168104 | 6/1994 |
| CN | 1507531 | 6/2004 |
| CN | 101328769 | 12/2008 |
| CN | 101592475 | 12/2009 |
| CN | 201496028 | 6/2010 |
| CN | 101842547 | 9/2010 |
| CN | 102471701 | 5/2012 |
| CN | 101488805 | 8/2012 |
| CN | 102707314 | 10/2012 |
| CN | 102749648 | 10/2012 |
| CN | 102854533 | 1/2013 |
| CN | 102998703 | 3/2013 |
| CN | 202851445 | 4/2013 |
| CN | 103185025 | 7/2013 |
| CN | 203420906 | 2/2014 |
| CN | 103645507 | 3/2014 |
| CN | 102425374 | 7/2014 |
| CN | 103913186 | 7/2014 |
| CN | 104141633 | 11/2014 |
| CN | 104483704 | 4/2015 |
| CN | 104533797 | 4/2015 |
| CN | 105043586 | 11/2015 |
| CN | 105136337 | 12/2015 |
| CN | 103835988 | 1/2016 |
| CN | 105239963 | 1/2016 |
| CN | 103717901 | 6/2016 |
| CN | 106895959 | 6/2017 |
| CN | 107144339 | 9/2017 |
| CN | 206496768 | 9/2017 |
| CN | 105371943 | 6/2018 |
| CN | 107664541 | 6/2018 |
| CN | 108534910 | 9/2018 |
| CN | 104236644 | 12/2018 |
| DE | 2260678 | 6/1974 |
| DE | 3022241 | 12/1981 |
| DE | 3444859 | 6/1985 |
| DE | 3520884 | 1/1986 |
| DE | 19654092 | 7/1998 |
| DE | 10307887 | 10/2004 |
| DE | 102007005426 | 5/2008 |
| DE | 102008001607 | 11/2009 |
| DE | 102008054766 | 6/2010 |
| DE | 202012103729 | 10/2012 |
| DE | 102012215023 | 1/2014 |
| DE | 102012022453 | 5/2014 |
| DE | 102013200450 | 7/2014 |
| DE | 102012205757 | 8/2014 |
| EP | 0380148 | 8/1990 |
| EP | 0510774 | 10/1992 |
| EP | 0579981 | 1/1994 |
| EP | 0637675 | 2/1995 |
| EP | 1041244 | 10/2000 |
| EP | 1101024 | 5/2001 |
| EP | 1143104 | 10/2001 |
| EP | 1270900 | 1/2003 |
| EP | 1369588 | 12/2003 |
| EP | 2072971 | 6/2009 |
| EP | 2801696 | 12/2014 |
| EP | 2893301 | 5/2018 |
| EP | 3527830 | 8/2019 |
| GB | 670206 | 4/1952 |
| GB | 2173034 | 10/1986 |
| GB | 2218721 | 11/1989 |
| GB | 2226776 | 7/1990 |
| GB | 2283035 | 4/1995 |
| GB | 2313445 | 11/1997 |
| GB | 2348674 | 10/2000 |
| GB | 2477909 | 8/2011 |
| GB | 2504104 | 1/2014 |
| JP | 4019375 | 1/1992 |
| JP | 2005076486 | 3/2005 |
| JP | 2007135124 | 5/2007 |
| JP | 2007527157 | 9/2007 |
| JP | 2010156172 | 7/2010 |
| JP | 2013110910 | 6/2013 |
| RU | 2270907 | 2/2006 |
| RU | 98500 | 10/2010 |
| RU | 122531 | 11/2012 |
| RU | 178531 | 4/2018 |
| WO | WO 1993006331 | 4/1993 |
| WO | WO 1995004869 | 2/1995 |
| WO | WO 1998046857 | 10/1998 |
| WO | WO 1999027256 | 6/1999 |
| WO | WO 2002072998 | 9/2002 |
| WO | WO 2005066502 | 7/2005 |
| WO | WO 2005078601 | 8/2005 |
| WO | WO 2009024544 | 2/2009 |
| WO | WO 2009024545 | 2/2009 |
| WO | WO 2009030870 | 3/2009 |
| WO | WO 2009046709 | 4/2009 |
| WO | WO 2009113894 | 9/2009 |
| WO | WO 2009129607 | 10/2009 |
| WO | WO 2011066050 | 6/2011 |
| WO | WO 2011101296 | 8/2011 |
| WO | WO 2011133620 | 10/2011 |
| WO | WO 2011135541 | 11/2011 |
| WO | WO 2012058290 | 5/2012 |
| WO | WO 2012166638 | 12/2012 |
| WO | WO 2013005091 | 1/2013 |
| WO | WO 2013089746 | 6/2013 |
| WO | WO 2013171053 | 11/2013 |
| WO | WO 2014114683 | 7/2014 |
| WO | WO 2014116458 | 7/2014 |
| WO | WO 2014127035 | 8/2014 |
| WO | WO 2014147645 | 9/2014 |
| WO | WO 2015034482 | 3/2015 |
| WO | WO 2015041655 | 3/2015 |
| WO | WO 2015073018 | 5/2015 |
| WO | WO 2015078842 | 6/2015 |
| WO | WO 2015084926 | 6/2015 |
| WO | WO 2015123236 | 8/2015 |
| WO | WO 2015192239 | 12/2015 |
| WO | WO 2016003662 | 1/2016 |
| WO | WO 2016003985 | 1/2016 |
| WO | WO 2016012245 | 1/2016 |
| WO | WO 2016050301 | 4/2016 |
| WO | WO 2016081389 | 5/2016 |
| WO | WO 2016089526 | 6/2016 |
| WO | WO 2016111849 | 7/2016 |
| WO | WO 2016130620 | 8/2016 |
| WO | WO 2016160016 | 10/2016 |
| WO | WO 2016195643 | 12/2016 |
| WO | WO 2016195846 | 12/2016 |
| WO | WO 2017021553 | 2/2017 |
| WO | WO 2017146593 | 8/2017 |
| WO | WO 2017197203 | 11/2017 |
| WO | WO 2018022198 | 2/2018 |
| WO | WO 2018096345 | 5/2018 |
| WO | WO 2018125071 | 7/2018 |
| WO | WO 2018145215 | 8/2018 |
| WO | WO 2018160347 | 9/2018 |

(56) References Cited

FOREIGN PATENT DOCUMENTS

| | | |
|---|---|---|
| WO | WO 2019243789 | 12/2019 |
| WO | WO 2020089670 | 5/2020 |
| WO | WO-2020244684 A1 * | 12/2020 |

OTHER PUBLICATIONS

U.S. Appl. No. 17/237,746, filed Apr. 22, 2021, Colombo et al.

Abelsson et al., "Development and Testing of a Hybrid Boosting Pump," OTC 21516, Offshore Technology Conference, presented at the Offshore Technology Conference, May 2-5, 2011, 9 pages.

Ahmadi et al., "Comparison of machine learning methods for estimating permeability and porosity of oil reservoirs via petrophysical logs," Petroleum, 2019, 5:271-284, 14 pages.

Akinade et al., "Improving the Rheological Properties of Drilling Mud Using Local Based Materials," American Journal of Engineering Research, Jan. 2018, 7 pages.

Al-Ali et al., "Vibrator Attribute Leading Velocity Estimation," The Leading Edge, May 2003, 5 pages.

Alexandrov et al., "Improving imaging and repeatability on land using virtual source redatuming with shallow buried receivers," XPo55463335, Geophysics 8:2, Mar. 1, 2015, 12 pages.

Alexandrov et al., "Improving land seismic repeatability with virtual source redatuming: synthesis case study," Society of Exploration Geophysicists (SEG), presented at the SEG Las Vegas 2012 Annual Meeting, SEG Technical Program Expanded Abstracts 2012, 1-5, Sep. 2012, 5 pages.

Al-Hameedi et al., "Mud loss estimation using machine learning approach," Journal of Petroleum Exploration and Production Technology, Jun. 2019, 9:2 (1339-1354), 16 pages.

Alhanati et al., "ESP Failures: Can we talk the same language?" Society of Petroleum Engineers (SPE), SPE ESP Workshop held in Houston, Apr. 25-27, 2001, 11 page.

Alhasan et al., "Extending mature field production life using a multiphase twin screw pump," BHR Group Multiphase 15, 2011, 11 pages.

Alsaihati et al., "Real-Time Prediction of Equivalent Circulation Density for Horizontal Wells Using Intelligent Machines," American Chemical Society (ACS), ACS Omega., Jan. 2021, 6(1): 934-942, 9 pages.

Andrianov, "A machine learning approach for virtual flow metering and forecasting, " IFAC PapersOnLine, 2018, 51:8 (191-196), 6 pages.

Anoop et al., "Viscosity measurement dataset for a water-based drilling mud-carbon nanotube suspension at high-pressure and high-temperature," Data in Brief., Jun. 2019, 24: 103816, 5 pages.

Antony et al., "Photonics and fracture toughness of heterogeneous composite materials," 2017, Scientific Reports, 7:4539, 8 pages.

Askari and Siahkoohi, "Ground roll attenuation using the S and x-f-k transforms," Geophysical Prospecting 56, Jan. 2008, 10 pages.

Baker Hughes, "Multiphase Pump: Increases Efficiency and Production in Wells with High Gast Content," Brochure overview, retrieved from URL <https://assets.www.bakerhughes.com/system/69/00d970d9dd11e3a411ddf3c1325ea6/28592.MVP_Overview.pdf>, 2014, 2 pages.

Bakulin and Calvert, "The virtual source method: Theory and case study," Geophysics 71:4, Jul.-Aug. 2006, 12 pages.

Bakulin and Calvert, "Virtual Source: new method for imaging and 4D below complex overburden," Society of Exploration Geophysicists (SEG), presented at the SEG International Exposition and 74th Annual Meeting, Oct. 10-15, 2004, 4 pages.

Bao et al., "Recent development in the distributed fiber optic acoustic and ultrasonic detection," Journal of Lightwave Technology 35:16, Aug. 15, 2017, 12 pages.

Batarseh et al., "Downhole high-power laser tools development and evolutions," presented at the Abu Dhabi International Petroleum & Exhibition Conference, Abu Dhabi, United Arab Emirates, Nov. 12-15, 2018, 15 pages.

Batarseh et al., "High power laser application in openhole multiple fracturing with an overview of laser research; Past, present and future," Society of Petroleum Engineers (SPE), presented at the SPE Saudi Arabia Section Technical Symposium and Exhibition, Khobar, Saudi Arabia, Apr. 8-11, 2012, 10 pages.

Batarseh et al., "Laser Gun: The Next Perforation Technology," Society of Petroleum Engineers (SPE), presented at the SPE Middle East Oil & Gas Show and Conference, Manama, Bahrain, Mar. 18-21, 2019, 15 pages.

Batarseh et al., "Microwave With Assisted Ceramic Materials to Maximize Heat Penetration and Improve Recovery Efficiency of Heavy Oil Reservoirs," Society of Petroleum Engineers (SPE), presented at the SPE Middle East Oil & Gas Show and Conference, Kingdom of Bahrain, Mar. 6-9, 2017, 24 pages.

Batarseh et al., "Well Perforation Using High-Power Lasers," Society of Petroleum Engineers (SPE), presented at the SPE Annual Technical Conference and Exhibition, Denver, Colorado, Oct. 5-8, 2003, 10 pages.

Beck et al., "The Effect of Rheology on Rate of Penetration," SPE/IADC 29368, Society of Petroleum Engineers (SPE), Drilling Conference., Jan. 1995, 9 pages.

Bég et al., "Experimental study of improved rheology and lubricity of drilling fluids enhanced with nano-particles," Applied Nanoscience., Jun. 2018, 8(5): 1069-1090, 22 pages.

Bikmukhametov et al., "Combining machine learning and process engineering physics towards enhanced accuracy and explainability of data-driven models," Computers and Chemical Engineering, Jul. 2020, 138:106834, 27 pages.

Bikmukhametov et al., "First principles and machine learning virtual flow metering: A literature review," Journal of Petroleum Science and Engineering, Jan. 2020, 184:106487, 26 pages.

Blunt, "Effects of heterogeneity and wetting on relative permeability using pore level modeling," SPE 36762, Society of Petroleum Engineers (SPE), SPE Journal 2:01 (70-87), Mar. 1997, 19 pages.

Boinott et al., "High resolution geomechanical profiling in heterogeneous source rock from the Vaca Muerta Formation, Neuquén Basin, Argentina," presented at the 52nd US Rock Mechanics/Geomechanics Symposium, Seattle, Washington, USA, American Rock Mechanics Association, Jun. 17-20, 2018, 8 pages.

Born et al., "Principles of Optics: Electromagnetic Theory of Propagation, Interference and Diffraction of Light," 6th ed. Pergamon Press, 808 pages.

Bryant and Blunt, "Prediction of relative permeability in simple porous media," Physical Review A 46:4, Aug. 1992, 8 pages.

Bybee et al., "Through-Tubing Completions Maximize Production," SPE-0206-0057, Society of Petroleum Engineers (SPE), Drilling and Cementing Technology, JPT, Feb. 2006, 2 pages.

Cadzou, "Signal enhancement—A Composite Property Mapping Algorithm," Institute of Electrical and Electronics Engineers (IEEE), IEEE Transactions on Acoustics, Speech and Signal Processing, 36:1, Jan. 1988, 14 pages.

Carvill, "Integration of an extensive uphole program with refraction analysis to build a 3-D near-surface model on a workstation: A case history," Society of Exploration Geophysicists (SEG), SEG Technical Program Expanded Abstracts, 1995, 4 pages.

Champion et al., "The application of high-power sound waves for wellbore cleaning," SPE 82197, Society of Petroleum Engineers International (SPE), presented at the SPE European Formation Damage Conference, May 13-14, 2003, 10 pages.

Chappell and Lancaster, "Comparison of methodological uncertainties within permeability measurements," Wiley InterScience, Hydrological Processes, Jan. 2007, 21(18):2504-2514, 11 pages.

Chen et al., "Distributed acoustic sensor based on two-mode fiber," Optics Express, Sep. 2018, 26(19), 9 pages.

Chen, "Application of Machine Learning Methods to Predict Well Productivity in Montney and Duvernay," University of Calgary, Apr. 2019, pages.

Chen, "Robust matrix rank reduction methods for seismic data processing, " Thesis for the degree of Master of Science in Geophysics, University of Alberta, Fall of 2013, 136 pages.

Christiawan et al., "Innovative Multi Technologies Collaboration for Ultra-HP/H Offshore Fracturing Stimulation," OTC-26663-MS, Offshore Technology Conference (OTC), presented at the Offshore Technology Conference Asia, Mar. 22-25, 2016, 26 pages.

(56) References Cited

OTHER PUBLICATIONS

Corona et al., "Novel Washpipe-Free ICD Completion With Dissolvable Material," OTC-28863-MS, Offshore Technology Conference (OTC), presented at the Offshore Technology Conference, Apr. 30-May 3, 2018, 10 pages.

Cox et al., "Realistic Assessment of Proppant Pack Conductivity for Material Section," SPE-84306-MS, Society of Petroleum Engineers (SPE), presented at the SPE Annual Technical Conference and Exhibition, Oct. 5-8, 2003, 12 pages.

Cramer et al., "Development and Application of a Downhole Chemical Injection Pump for Use in ESP Applications," SPE 14403, Society of Petroleum Engineers (SPE), presented at the 66th Annual Technical Conference and Exhibition, Sep. 22-25, 1985, 6 page.

Danfoss, "Facts Worth Knowing about Frequency Converters," Handbook VLT Frequency Converters, Danfoss Engineering Tomorrow, 180 pages.

Demori et al., "A capacitive sensor system for the analysis of two-phase flows of oil and conductive water," Sensors and Actuators A: Physical, 2010, 163:1 (172-179), 8 pages.

Diallo et al., "Characterization of polarization attributes of seismic waves using continuous wavelet transforms," Geophysics 71:3, May-Jun. 2006, 12 pages.

DiCarlo et al., "Three-phase relative permeability of water-wet, oil-wet, and mixed-wet sandpacks," SPE 60767, Society of Petroleum Engineers (SPE), presented at the 1998 SPE Annual Technical Conference and Exhibition, Sep. 27-30, 1998, SPE Journal 5(1):82-91, Mar. 2000, 10 pages.

Dixit et al., "A pore-level investigation of relative permeability hysteresis in water-wet systems," SPE 37233, Society of Petroleum Engineers (SPE), presented at the 1997 SPE International Symposium on Oilfield Chemistry, Feb. 18-21, 1997, SPE Journal 3(2):115-123, Jun. 1998, 9 pages.

Douglas et al., "Methane clumped isotopes: Progress and potential for a new isotopic tracer," Organic Geochemistry 113, Nov. 2017, 21 pages.

ejprescott.com [online], "Water, Sewer and Drain Fittings B-22, Flange Adaptors," retrieved from URL <https://www.ejprescott.com/media/reference/FlangeAdaptorsB-22.pdf> retrieved on Jun. 15, 2020, available on or before Nov. 2010 via wayback machine URL <http://web.archive.org/web/20101128181255/https://www.ejprescott.com/media/reference/FlangeAdaptorsB-22.pdf>, 5 pages.

Erofeev et al., "Prediction of Porosity and Permeability Alteration Based on Machine Learning Algorithms," Transport in Porous Media, Springer, 2019, 24 pages.

Fan et al., "Well production forecasting based on ARIMA-LSTM model considering manual operations," Energy, Apr. 2021, 220:119708, 13 pages.

Fatt, "The network model of porous media," Spe 574-G, Society of Petroleum Engineers (SPE), I. Capillary Pressure Characteristics, AIME Petroleum Transactions, Dec. 1956, 207:144-181, 38 pages.

Fornarelli et al., "Flow patterns and heat transfer around six in-line circular cylinders at low Reynolds number," JP Journal of Heat and Mass Transfer, Pushpa Publishing House, Allahabad, India, Feb. 2015, 11(1):1-28, 28 pages.

Frank, "Discriminating between coherent and incoherent might with metasurfaces," Jul. 2018, 11 pages.

Gadani et al., "Effect of salinity on the dielectric properties of water," Indian Journal of Pure & Applied Physics, Jun. 2012, 50: 405-410, 6 pages.

Geary et al., "Downhole Pressure Boosting in Natural Gas Wells: Results from Prototype Testing," SPE 11406, Society of Petroleum Engineers International (SPE), presented at the SPE Asia Pacific Oil and Gas Conference and Exhibition, Oct. 20-22, 2008, 13 pages.

Gholami et al., "Applications of artificial intelligence methods in prediction of permeability in hydrocarbon reservoirs," Journal of Petroleum Science and Engineering, Oct. 2014, 122:643-656, 14 pages.

Gillard et al., "A New Approach to Generating Fracture Conductivity," SPE-135034-MS, Society of Petroleum Engineers (SPE), presented at the SPE Annual Technical Conference and Exhibition, Sep. 20-22, 2010, 14 pages.

Godbole et al., "Axial Thrust in Centrifugal Pumps—Experimental Analysis," Paper Ref: 2977, presented at the 15th International Conference on Experimental Mechanics, ICEM15, Jul. 22-27, 2012, 14 pages.

Gomaa et al., "Computational Fluid Dynamics Applied to Investigate Development and Optimization of Highly Conductive Channels within the Fracture Geometry," SPE-179143-MS, Society of Petroleum Engineers (Spe), Spe Production & Operations, 32:04, Nov. 2017, 12 pages.

Gomaa et al., "Improving Fracture Conductivity by Developing and Optimizing a Channels Within the Fracture Geometry: CFD Study," SPE-178982-MS, Society of Petroleum Engineers (SPE), presented at the SPE International Conference and Exhibition on Formation Damage Control, Feb. 24-26, 2016, 25 pages.

Goodfellow et al., "Generative Adversarial Nets," Advances in Neural Information Processing Systems, 2014, 9 pages.

Govardhan et al., "Critical mass in vortex-induced vibration of a cylinder," European Journal of Mechanics B/Fluids, Jan.-Feb. 2004, 23(1):17-27, 11 pages.

Gowida et al., "Data-Driven Framework to Predict the Rheological Properties of $CaCl_2$ Brine-Based Drill-in Fluid Using Artificial Neural Network," Energies, 2019, 12, 1880, 33 pages.

Graves et al., "Temperatures Induced by High Power Lasers: Effects on Reservoir Rock Strength and Mechanical Properties," Society of Petroleum Engineers (SPE), presented at the SPE/ISRM Rock Mechanics Conference, Irvine, Texas, Oct. 20-23, 2002, 7 pages.

Gryphon Oilfield Solutions, "Echo Dissolvable Fracturing Plug," EchoSeries, Dissolvable Fracturing Plugs, Aug. 2018, 1 page.

Guo et al., "Convolutional Neural Networks for Steady Flow Approximation," Association for Computing Machinery (ACM), presented at the 22nd ACM SIGKDD International Conference on Knowledge Discovery and Data Mining—KDD, San Francisco, California, Aug. 13-17, 2016, 10 pages.

Halliday et al., "Interferometric ground-roll removal: Attenuation of scattered surface waves in single-sensor data," XP001553286, Society of Exploration Geophysicists (SEG), Geophysics, 75:2, Mar. 1, 2010, 11 pages.

Harstad et al., "Field Performance Evaluation of a Non-Radioactive MPFM in Challenging Conditions in the Middle East," 35th International North Sea Flow Measurement Workshop, Oct. 24-26, 2017, 19 pages.

Heiba et al., "Percolation theory of two-phase relative permeability," Society of Petroleum Engineers (SPE), SPE Reservoir Engineering, Feb. 1992, 7(1):123-132, 11 pages.

Hua et al., "Comparison of Multiphase Pumping Techniques for Subsea and Downhole Applications," SPE 146784, Society of Petroleum Engineers International (SPE), presented at the SPE Annual Technical Conference and Exhibition, Oct. 30-Nov. 2, 2011, Oil and Gas Facilities, Feb. 2012, 11 pages.

Hui and Blunt, "Effects of wettability on three-phase flow in porous media" American Chemical Society (ACS), J. Phys. Chem., Feb. 2000, 104(16):3833-3845, 13 pages.

Huiyun et al., "Review of intelligent well technology," Petroleum, Sep. 2020, 6(3):226-233, 8 pages.

Juarez and Taylor, "Field test of a distributed fiber-optic intrusion sensor system for long perimeters," Applied Optics, Apr. 2007, 46(11), 4 pages.

Karimi et al., "Design and Dynamic Characterization of an Orientation Insensitive Microwave Water-Cut Sensor," IEEE Transactions on Microwave Theory and Techniques, Jan. 2018, 66(1):530-539, 10 pages.

Keiser, "Optical fiber communications," 26-57, McGraw Hill, 2008, 16 pages.

Kern et al., "Propping Fractures With Aluminum Particles," SPE-1573-G-PA, Society of Petroleum Engineers (SPE), Journal of Per. Technology, Jun. 1961, 13(6):583-589, 7 pages.

Kim et al., "Generation of Synthetic Density Log Data Using Deep Learning Algorithm at the Golden Field in Alberta, Canada," Geofluids, 2020, 26 pages.

(56) References Cited

OTHER PUBLICATIONS

Krag et al., "Preventing Scale Deposition Downhole Using High Frequency Electromagnetic AC Signals from Surface Enhance Production Offshore Denmark," SPE-170898-MS, Society of Petroleum Engineers International (SPE), presented at the SPE Annual Technical Conference and Exhibition, Oct. 27-29, 2014, 10 pages.
laserfocusworld.com [online], "High-Power Lasers: Fiber lasers drill for oil," Dec. 5, 2012, retrieved on May 31, 2018, retrieved from URL: <https://www.laserfocusworld.com/articles/print/volume 48/issue-12/world-news/high-power-lasers-fiber-lasers-drill-for-oil.html>, 4 pages.
Li and Nozaki, "Application of Wavelet Cross-Correlation Analysis to a Plane Turbulent Jet," JSME International Journal Series B, 40:1, Feb. 15, 1997, 9 pages.
Li et al., "In Situ Estimation of Relative Permeability from Resistivity Measurements," EAGE/The Geological Society of London, Petroleum Geoscience, 2014, 20:143-151, 10 pages.
Ling et al., "A fast SVD for multilevel block Handkel matrices with minimal memory storage," Numerical Algorithms, Baltzer, Amsterdam, 69:4, Oct. 28, 2014, 17 pages.
Liu and Fomel, "Seismic data analysis using local time-frequency decomposition," Geophysical Prospecting 61:3, May 2013, 21 pages.
Loh et al., "Deep learning and data assimilation for real-time production prediction in natural gas wells," 2018, 7 pages.
machinedesign.com [online], Frances Richards, "Motors for efficiency: Permanent-magnet, reluctance, and induction motors compared," Apr. 2013, retrieved on Nov. 11, 2020, retrieved from URL <https://www.machinedesign.com/motors-drives/article/21832406/motors-for-efficiency-permanentmagnet-reluctance-and-induction-motors-compared>, 14 pages.
Mahmud et al., "Effect of network topology on two-phase imbibition relative permeability," Transport in Porous Media, Feb. 2007, 66(3):481-493, 14 pages.
Mallat and Zhang, "Matching Pursuits With Time-Frequency Dictionaries," Institute of Electrical and Electronics Engineers (IEEE), IEEE Transactions on Signal Processing 41:12, Dec. 1993, 19 pages.
Mehta et al., "Improving the virtual source method by wavefield separation," Geophysics 72:4, Jul.-Aug. 2007, 8 pages.
Mehta et al., "Strengthening the virtual-source method for time-lapse monitoring," Geophysics 73:3, May-Jun. 2008, 8 pages.
Meyer et al., "Theoretical Foundation and Design Formulae for Channel and Pillar Type Propped Fractures—A Method to Increase Fracture Conductivity," SPE-170781-MS, Society of Petroleum Engineers (SPE), presented at the SPE Annual Technical Conference and Exhibition, Oct. 27-29, 2014, 25 pages.
Mirza, "The Next Generation of Progressive Cavity Multiphase Pumps use a Novel Design Concept for Superior Performance and Wet Gas Compression," Flow Loop Testing, BHR Group, 2007, 9 pages.
Mirza, "Three Generations of Multiphase Progressive Cavity Pumping," Cahaba Media Group, Upstream Pumping Solutions, Winter 2012, 6 pages.
Monteiro et al., "Uncertainty analysis for production forecast in oil wells," Society of Petroleum Engineers (SPE), SPE Latin America and Caribbean Petroleum Engineering Conference, May 2017, 11 pages.
Muswar et al., "Physical Water Treatment in the Oil Field Results from Indonesia," SPE 113526, Society of Petroleum Engineers International (SPE), presented at the SPE Asia Pacific Oil and Gas Conference and Exhibition, Oct. 18-20, 2010, 11 pages.
Mutyala et al., "Microwave applications to oil sands and petroleum: A review," Fuel Process Technol, 2010, 91:127-135, 9 pages.
Nagy et al., "Comparison of permeability testing methods," Proceedings of the 18th International Conference on Soil Mechanics and Geotechnical Engineering, 2013, 399-402, 4 pages.
Nourbakhsh et al., "Embedded sensors and feedback loops for iterative improvement in design synthesis for additive manufacturing," American Society of Mechanical Engineers (ASME), presented at the ASME 2016 International Design Engineering Technical Conference and Information in Engineering Conference, Charlotte, NC, 9 pages.
O'brien et al., "StarWars Laser Technology for Gas Drilling and Completions in the 21st Century," Society of Petroleum Engineers (SPE), presented at the SPE Annual Technical Conference and Exhibition, Houston, Texas, Oct. 3-6, 1999, 10 pages.
Ono et al., "Measurement of a Doubly Substituted Methane Isotopologue, 13CH3D, by Tubable Infrared Laser Direct Absorption Spectroscopy," Analytical Chemistry, 86, Jun. 2014, 8 pages.
Palisch et al., "Determining Realistic Fracture Conductivity and Understanding its Impact on Well Performance—Theory and Field Examples," SPE-106301-MS, Society of Petroleum Engineers (SPE), presented at the 2007 SPE Hydraulic Fracturing Technology Conference, Jan. 29-31, 2007, 13 pages.
Parker, "About Gerotors," Parker Haffinfin Corp, 2008, 2 pages.
Pevzner et al., "Repeatability analysis of land time-lapse seismic data: CO2CRC Otway pilot project case study," Geophysical Prospecting 59, Jan. 2011, 12 pages.
Poollen et al., "Hydraulic Fracturing—FractureFlow Capacity vs Well Productivity," SPE-890-G, Society of Petroleum Engineers (SPE), presented at 32nd Annual Fall Meeting of Society of Petroleum Engineers, Oct. 6-9, 1957, published as Petroleum Transactions AIME 213, 1958, 5 pages.
Poollen, "Productivity vs Permeability Damage in Hydraulically Produced Fractures," Paper 906-2-G, American Petroleum Institute, presented at Drilling and Production Practice, Jan. 1, 1957, 8 pages.
Purcell, "Capillary pressures—their measurement using mercury and the calculation of permeability therefrom," Petroleum Transactions, AIME, presented at the Branch Fall Meeting, Oct. 4-6, 1948, Journal of Petroleum Technology, Feb. 1949, 1(2):39-48, 10 pages.
Qin et al., "Signal-to-Noise Ratio Enhancement Based on Empirical Mode Decomposition in Phase-Sensitive Optical Time Domain Reflectometry Systems," Sensors, MDPI, 17:1870, Aug. 14, 2017, 10 pages.
Rzeznik et al., "Two Year Results of a Breakthrough Physical Water Treating System for the Control of Scale in Oilfield Applications," SPE114072, Society of Petroleum Engineers International (SPE), presented at the 2008 SPE International Oilfield Scale Conference, May 28-29, 2008, 11 pages.
Salehi et al., "Laser drilling—drilling with the power of light," Gas Technology Institute Report, 2000- 2007 period report, Chicago, IL, 318 pages.
San-Roman-Alergi et al., "Machine learning and the analysis of high-power electromagnetic interaction with subsurface matter," Society of Petroleum Engineers (SPE), presented at the SPE Middle East Oil and Gas Show and Conference, Manama, Bahrain, Mar. 18-21, 2019, 11 pages.
San-Roman-Alerigi et al., "Geomechanical and thermal dynamics of distributed and far-field dielectric heating of rocks assisted by nano-enablers—A numerical exploration," Society of Petroleum Engineers (SPE), presented at the SPE Abu Dhabi International Petroleum Exhibition and Conference, Abu Dhabi, UAE, Nov. 13-16, 2017, 21 pages.
San-Roman-Alerigi et al., "Numerical Modeling of Thermal and Mechanical Effects in Laser-Rock Interaction—an Overview," presented at the 50th U.S. Rock Mechanics/Geomechanics Symposium, Houston, TX, Jun. 26-29, 2016; American Rock Mechanics Association, 2016, 11 pages.
Sawaryn et al., "A Compendium of Directional Calculations Based on the Minimum Curvature Method," SPE-84246-PA, Society of Petroleum Engineers (SPE), SPE Drilling & Completions 20:1, Jan. 2005, 24-36, 13 pages.
Schlumberger, "AGH: Advanced Gas-Handling Device," Product Sheet, retrieved from URL: <http://www.slb.com/~/media/Files/artificial_lift/product_sheets/ESPs/advanced_gas_handling_ps.pdf>, Jan. 2014, 2 pages.
Schöneberg, "Wet Gas Compression with Twin Screw Pumps," Bornemann Pumps, Calgary Pump Symposium 2005, 50 pages.
Simpson et al., "A Touch, Truly Multiphase Downhole Pump for Unconventional Wells," SPE-185152-MS, Society of Petroleum

(56) References Cited

OTHER PUBLICATIONS

Engineers (SPE), presented at the SPE Electric Submersible Pump Symposium, the Woodlands, Texas, Apr. 24-28, 2017, 20 pages.
Sulzer Technical Review, "Pushing the Boundaries of Centrifugal Pump Design," Oil and Gas, Jan. 2014, 2 pages.
Sun et al., "Comparison of declin curve analysis DCA with recursive neural networks RNN for production forecast of multiple wells," Society of Petroleum Engineers (SPE), SPE Western Regional Meeting, Apr. 2018, 11 pages.
Takahashi et al., "Degradation Study on Materials for Dissolvable Frac Plugs," URTEC-2901283-MS, Unconventional Resources Technology Conference (URTC), presented at the SPE/AAPG/SEG Unconventional Resources Technology Conference, Jul. 23-25, 2018, 9 pages.
Terves, "TervAlloy Degradable Magnesium Alloys," Terves Engineered Response, Engineered for Enhanced Completion Efficiency, Feb. 2018, 8 pages.
Thompson et al., "Designing and Validating 2D Reservoir Models," SPE-188066-MS, Society of Petroleum Engineers (SPE), SPE Kingdom of Saudi Arabia ATSE, Apr. 2017, 13 pages.
Tinsley and Williams, "A new method for providing increased fracture conductivity and improving stimulation results," SPE-4676-PA, Society of Petroleum Engineers (SPE), Journal of Petroleum Technology, Nov. 1975, 27(11), 7 pages.
tm4.com [online], "Outer rotor for greater performance," available on or before Dec. 5, 2017, via internet archive: Wayback Machine URL <https://web.archive.org/web/20171205163856/https://www.tm4.com/technology/electric-motors/external-rotor-motor-technology/>, retrieved on May 17, 2017, retrieved from URL <https://www.tm4.com/technology/electric-motors/external-rotor-motor-technology/>, 2 pages.
towardsdatascience.com [online], "K-Means Clustering—Explained," Yildrim, Mar. 2020, retrieved on May 19, 2021, retrieved from URL <https://towardsdatascience.com/k-means-clustering-explained-4528df86a120#:~:text=K%2Dmeans%20clustering%20aims%20to,methods%20to%20measure%20the%20distance>, 12 pages.
towardsdatascience.com [online], "Support vector machine—introduction to machine learning algorithms," Ghandi, Jul. 7, 2018, retrieved May 19, 2021, retrieved from URL <https://towardsdatascience.com/support-vector-machine-introduction-to-machine-learning-algorithms-934a444fca47>, 12 pages.
Trickett et al., "Robust rank-reduction filtering for erratic noise," Society of Exploration Geophysicists (SEG), presented at the SEG Las Vergas 2012 Annual Meeting, Nov. 4-9, 2012, 5 pages.
Ulrych et al., "Tutorial: Signal and noise separation: Art and science," Geophysics 64:5, Sep.-Oct. 1999, 9 pages.
Vaferi et al., "Modeling and analysis of effective thermal conductivity of sandstone at high pressure and temperature using optimal artificial neural networks," Journal of Petroleum Science and Engineering, 2014, 119, 10 pages.
Van der Neut and Bakulin, "Estimating and correcting the amplitude radiation pattern of a virtual source," Geophysics 74:2, Mar.-Apr. 2009, 10 pages.
Van der Neut et al., "Controlled-source interferometric redatuming by crosscorrelation and multidimensional deconvolution in elastic media, " Geophysics 76:4, Jul.-Aug. 2011, 14 pages.
Van der Neut, "Interferometric redatuming by multidimensional deconvulution," Thesis for the degree of Master of Applied Geophysics, Technische Universiteit Delft, Dec. 17, 2012, 295 pages.
Vesnaver et al., "Geostatistical integration of near-surface geophysical data," Geophysical Prospecting, 2006, 54:6 (763-777), 15 pages.
Vincent, "Examining Our Assumptions—Have Oversimplifications Jeopardized our Ability to Design Optimal Fracture Treatments," SPE-119143-MS, Society of Petroleum Engineers (SPE), presented at the 2009 SPE Hydraulic Fracturing Technology Conference, Jan. 19-21, 2009, 51 pages.

Vincent, "Five Things You Didn't Want to Know about Hydraulic Fractures, " ISRM-ICHF-2013-045, presented at the International Conference for Effective and Sustainable Hydraulic Fracturing: An ISRM specialized Conference, May 20-22, 2013, 14 pages.
Vysloukh, "Chapter 8: Stimulated Raman Scattering," Nonlinear Fiber Optics, 1990, 298-302, 5 pages.
Walker et al., "Proppants, We Don't Need No Proppants—A Perspective of Several Operators," SPE-38611-MS, Society of Petroleum Engineers (SPE), presented at the 1997 Annual Technical Conference and Exhibition, Oct. 5-8, 1997, 8 pages.
Wang and et al., "Real-Time Distributed Vibration Monitoring System Using (1)-OTDR", IEEE Sensors Journal, 17:5, Mar. 1, 2017, 9 pages.
Wang et al., "Design and Calculation of Complex Directional-Well Trajectories on the Basis of the Minimum-Curvature Method," Society of Petroleum Engineers (SPE), SPE Drilling and Completion 34:2 (173-188), Jun. 2019, 16 pages.
Wang et al., "Rayleigh scattering in few-mode optical fibers," Scientific reports, 6:35844, Oct. 2016, 8 pages.
Wapenaar and Fokkema, "Green's function representations for seismic interferometry," Geophysics 71:4, Jul.-Aug. 2006, 14 pages.
wikipedia.org [online], "Hankel matrix," retrieved on Oct. 4, 2020, retrieved from URL <https://eri.wikipedia.org/wiki/Harikelmatrix>, Aug. 7, 2020, 5 pages.
Williams, "A new method for providing increased fracture conductivity and improving stimulation results," SPE-4676-PA, Society of Petroleum Engineers (SPE), Journal of Petroleum Technology, 27:11 (1319-1325), 1975, 7 pages.
Wood, "Predicting porosity, permeability and water saturation applying an optimized nearest-neighbour, machine-learning and data-mining network of well-log data," Journal of Petroleum Science and Engineering, 2019, 54 pages.
Wylde et al., "Deep Downhole Chemical Injection on BP-Operated Miller: Experience and Learning," SPE 92832, Society of Petroleum Engineers (SPE), presented at the 2005 SPE International Symposium on Oilfield Chemistry, May 11-12, 2005, SPE Production & Operations, May 2006, 6 pages.
Xiao et al., "Induction Versus Permanent Magnet Motors for ESP Applications," SPE-192177-MS, Society of Petroleum Engineers (SPE), presented at the SPE Kingdom of Saudi Arabia Annual Technical Symposium and Exhibition, Apr. 23-26, 2018, 15 pages.
Yamate et al., "Optical Sensors for the Exploration of Oil and Gas," Journal of Lightwave Technology, Aug. 2017, 35(16), 8 pages.
Yu et al., "Borehole seismic survey using multimode optical fibers in a hybrid wireline," Measurement, Sep. 2018, 125:694-703, 10 pages.
Yu et al., "Wavelet-Radon domain dealiasing and interpolation of seismic data," Geophysics 72:2, Mar.-Apr. 2007, 9 pages.
Zeng et al., "Optimal Selection of Stimulation Wells Using a Fuzzy Multicriteria Methodology," Mathmatical Problems in Engineering, 2019, 13 pages.
Zhan et al., "Characterization of Reservoir Heterogeneity Through Fluid Movement Monitoring with Deep Electromagnetic and Pressure Measurements," SPE 116328, Society of Petroleum Engineers International (SPE), presented at the 2008 SPE Annual Technical Conference and Exhibition, Sep. 21-24, 2008, 16 pages.
Zhao and Burnstad, "A new virtual source redatuming procedure to improve land 4D repeatability," Society of Exploration Geophysicists (SEG), presented a the 2015 SEG Annual Meeting, Oct. 18-23, 2015, 4 pages.
Zhao et al., "Virtual-source imaging and repeatability for complex near surface," Scientific Reports: Nature Search, 9:16656, 2019, 18 pages.
Zinati, "Using Distributed Fiber-Optic Sensing Systems to Estimate Inflow and Reservoir Properties," Technische Universiteit Delft, 2014, 135 pages.

\* cited by examiner

300

700

900

MODEL-CONSTRAINED MULTI-PHASE VIRTUAL FLOW METERING AND FORECASTING WITH MACHINE LEARNING

TECHNICAL FIELD

This disclosure relates generally to forecasting flow rates, and more particularly to forecasting multi-phase flow rates with machine learning.

BACKGROUND

Generally, a multi-phase flow includes oil, gas, and water flow and is frequently encountered in the production of oil and gas. Accurate multi-phase flow rate measurement plays a significant role in production optimization from oil and gas fields, especially in an offshore environment. In addition, production forecasts can provide important information to significantly influence field development planning and economic evaluation, including production optimization, rate allocation, reservoir management and predict the future performance of the field.

SUMMARY

An embodiment described herein provides a computer-implemented method for model constrained multi-phase virtual flow metering and forecasting. The method includes forecasting future target flow rates using unconstrained flow models trained using current and historic multi-phase flow rates. The method also includes forecasting auxiliary sensor data using trained well dynamics models. Further, the method includes constructing virtual sensing models trained using predicted target flow rates and well dynamics, wherein the virtual sensing model predicts real-time multi-phase flow rates. The method includes building a constrained forecasting model by combining the unconstrained flow forecasting models, well dynamics models, and virtual sensing models, wherein the constrained forecasting model forecasts multi-phase flow rates.

An embodiment described herein provides an apparatus comprising a non-transitory, computer readable, storage medium that stores instructions that, when executed by at least one processor, cause the at least one processor to perform operations. The operations include forecasting future target flow rates using unconstrained flow models trained using current and historic multi-phase flow rates. The operations also include forecasting auxiliary sensor data using trained well dynamics models. Further, the operations include constructing virtual sensing models trained using predicted target flow rates and well dynamics, wherein the virtual sensing model predicts real-time multi-phase flow rates. The operations include building a constrained forecasting model by combining the unconstrained flow forecasting models, well dynamics models, and virtual sensing models, wherein the constrained forecasting model forecasts multi-phase flow rates.

An embodiment described herein provides a system comprising one or more memory modules and one or more hardware processors communicably coupled to the one or more memory modules. The one or more hardware processors are configured to execute instructions stored on the one or more memory modules to perform operations. The operations include forecasting future target flow rates using unconstrained flow models trained using current and historic multi-phase flow rates. The operations also include forecasting auxiliary sensor data using trained well dynamics models. Further, the operations include constructing virtual sensing models trained using predicted target flow rates and well dynamics, wherein the virtual sensing model predicts real-time multi-phase flow rates. The operations include building a constrained forecasting model by combining the unconstrained flow forecasting models, well dynamics models, and virtual sensing models, wherein the constrained forecasting model forecasts multi-phase flow rates.

DETAILED DESCRIPTION

Embodiments described herein enable model-constrained multi-phase virtual flow metering and forecasting with machine learning approach. In particular, the present techniques estimate flow rates (for example, oil/water/gas flow rates) and forecast production rates using flow models combined with well dynamics models. The virtual flow metering according to the present techniques incorporates the internal changes in various formation and fluid factors as well as external influences due to manual operations. Internal changes in formation and fluid factors generally refers to the internal characteristics of each well, such as geological heterogeneity of the reservoir, well structure, boundary conditions, fluid properties, and the like. The internal characteristics of the wells vary from well to well, but are not directly impacted by manual operations. The external influences refer to the operation management events and manual operations, such as gas injection, choke valve, and the like. Traditional models generally do not provide combined multi-phase flow estimation and forecasting in a model-constrained manner, using machine learning.

Figure 1:
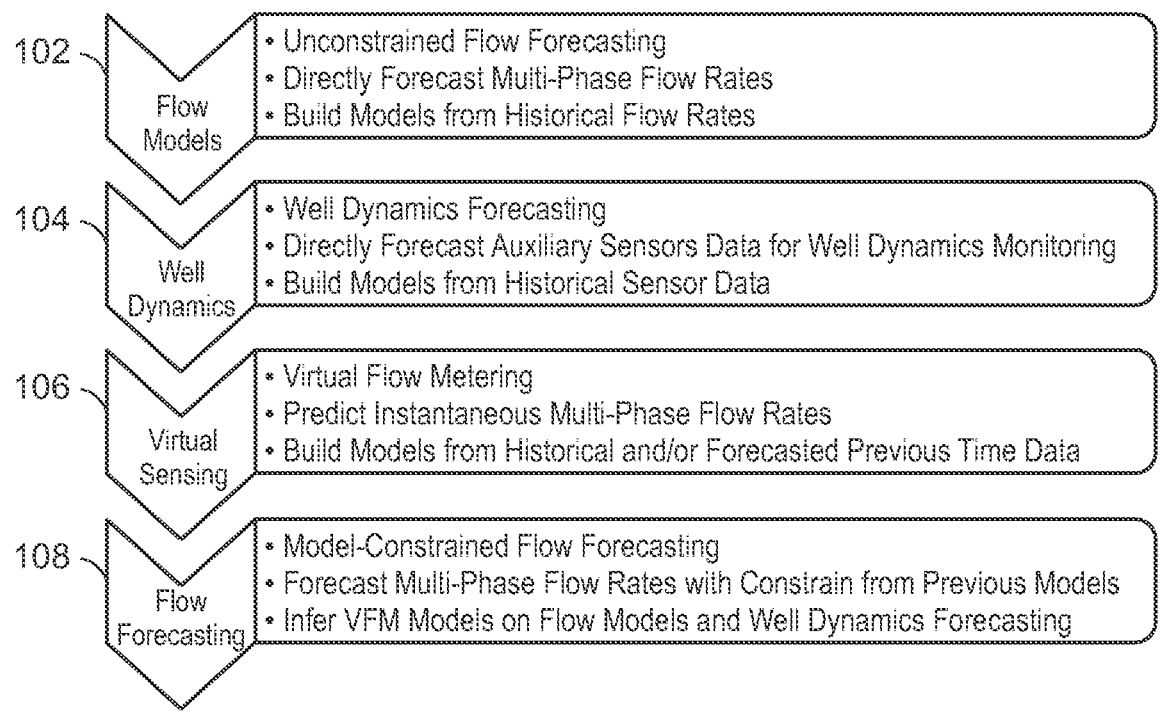
FIG. 1 is an illustration of a workflow that enables model-constrained multi-phase virtual flow metering and forecasting with a machine learning approach.

FIG. 1 is an illustration of a workflow 100 that enables model-constrained multi-phase virtual flow metering and forecasting with machine learning. Generally, the models and algorithms according to the present techniques enable predicting and forecasting multi-phase flow rates to assist production planning and optimization. The system consists of flow models 102, well dynamics models 104, virtual sensing models 106, and flow forecasting 108. The flow models 102, well dynamics models 104, virtual sensing models 106, and flow forecasting 108 are individually executable for each of their respective purposes. In embodiments, the flow models 102, well dynamics model 104, virtual sensing model 106, and flow forecasting 108 are combined as an integrated artificial intelligence based virtual flow metering system. Flow models 102 include unconstrained forecasting of flow rates. The flow models 102 directly forecast multi-phase flow rates and build models from historical flow rates. The well dynamics model 104 forecasts well dynamics directly from auxiliary sensor data. The well dynamics model 104 is built using historical sensor data. The virtual sensing model 106 enables virtual flow metering. The virtual sensing model 106 predicts instantaneous multi-phase flow rates. In some examples, the predicted instantaneous multi-phase flow rates are at a current time. In some examples, the virtual sensing model can predict flow rates from the sensor measurements forecasting at a future time with the forecasting of well dynamics model. Models are built from historical and/or forecast previous time data. Forecast previous time data includes estimates associated with a previous time. Generally, flow forecasting 108 enables model-constrained flow forecasting. In particular, multi-phase flow rates are forecast with constraints from models built using historical data or forecast previous time data. In embodiments, virtual flow metering models are inferred using flow models 102 and well dynamics model 104 as an input to a virtual sensing model 106.

In embodiments, the flow models 102, well dynamics model 104, virtual sensing model 106, and flow forecasting 108 of FIG. 1 are executed individually for each of the respective purposes. Alternatively, or additionally, the flow models 102, well dynamics model 104, virtual sensing model 106, and flow forecasting 108 operate together as an integrated artificial intelligence (AI) based virtual flow metering system. The models used are selected according to a particular use case. In a first example, in resource-limited or low data availability/quality scenarios a flow rate forecasting application based on flow models 102 may be more feasible to business stakeholder when compared to full virtual flow metering from the flow models 102, well dynamics model 104, virtual sensing model 106, and flow forecasting 108. Thus, unconstrained forecasting using the flow models 102 provides a viable solution to determine individual flow rates. In a second example, virtual flow metering is implemented by a business stakeholder as the constantly and lively monitored flow rates are the major focus. In this example, unconstrained forecasting using the flow models 102, well dynamics model 104, and virtual sensing model 106 provides real time monitoring of multi-phase flows. In a third example with resource-rich and high-data availability/quality scenarios, flow forecasting 108 (based on the flow models 102, well dynamics model 104, virtual sensing model 106) includes a high-confident flow rates forecasting application that aligns with the underlying well dynamics model. In this example, flow models 102, well dynamics model 104, virtual sensing model 106, and flow forecasting 108 together provide a complete solution. In embodiments, the constrained models obtained by flow forecasting 108 be generated using various inputs. In an example, the constrained models are built using modeled historical sensor data (for example, data output by a well dynamics model). In another example, the constrained models are built using both modeled historical sensor data and modeled historical flow rates (for example, data output by a flow model). In embodiments, a constrained model based on historical sensor data is built to focus on flow rates monitoring. A constrained model based on both modeled historical sensor data and modeled historical flow rates provides complete virtual flow metering and forecasting.

Generally, oil and gas production is affected by various factors, such as complexity of geological and reservoir data, dynamic operation management events, and rapid production rate changes due to development method diversity and manual interference. As a result, accurate production forecasting is complicated and challenging. Traditional techniques for building well production forecasting models suffer from requiring extensive domain knowledge. These techniques also do not have much flexibility due to their basis on complex reservoir and multiphase flow physics. Traditional techniques include numerical simulation models, analytical techniques, and decline curve analysis (DCA) models.

Numerical simulation models seek to fully describe the geological heterogeneity of the reservoir and can generally provide good results. However, the models are often tedious and time-consuming to build, where building generally involves establishing a reservoir geological model, numerical model, and history matching. Numerical simulation models also require various types of information and data about formation and multiphase flow fluid, such as logging, permeability, porosity, and saturation, which may not be available in reality or may be unreliable when available. Analytical techniques simplify complex reservoir models based on some assumptions regarding formation heterogeneity, well structure, boundary conditions and normal operation conditions. However, these analytical assumptions and results may not match those with actual production changes, especially frequent manual operations and dynamically varying underground multi-phase flow. Additionally, information regarding the correct formation and fluid data often requires long-lasting and expensive physical experiments. DCA models involve matching actual historical production rate/time data with a model, such as an exponential, harmonic, or hyperbolic model. The matched models conceptually fit abstract curves without considering the actual formation factors in general. Hence, it is difficult to guarantee the correct performance using DCA models.

In embodiments, the present techniques process production data as time series data. Machine learning, data-driven techniques are applied to time-series forecasting related applications. In embodiments, the time series analysis methods extract hidden information from historical data to predict future behavior of well production. The extracted information is combined with the reservoir and geological model and operation interferences. In some examples, the extracted hidden information includes a pattern of the time series, trend, seasonality, cycles, signal/noise ratio, frequency spectrum, similarity, etc. In some examples, the geological model may include formations, locations, rock properties, etc. Additionally, in examples the operation interferences includes operation management events and manual operations, such as gas injection, choke valve, etc. The present techniques use flow models 102 and a well dynamics model 104 as input to a virtual sensing model 106. Flow forecasting 108 is based on the virtual sensing model 106 constructed from historical and/or forecasted time data.

The block diagram of FIG. 1 is not intended to indicate that the workflow 100 is to include all of the components shown in FIG. 1. Rather, the workflow 100 can include fewer or additional components not illustrated in FIG. 1 (for example, additional models, sensor data, and the like). The workflow 100 may include any number of additional components not shown, depending on the details of the specific implementation. Furthermore, any of the functionalities of the workflow 100 may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 2:
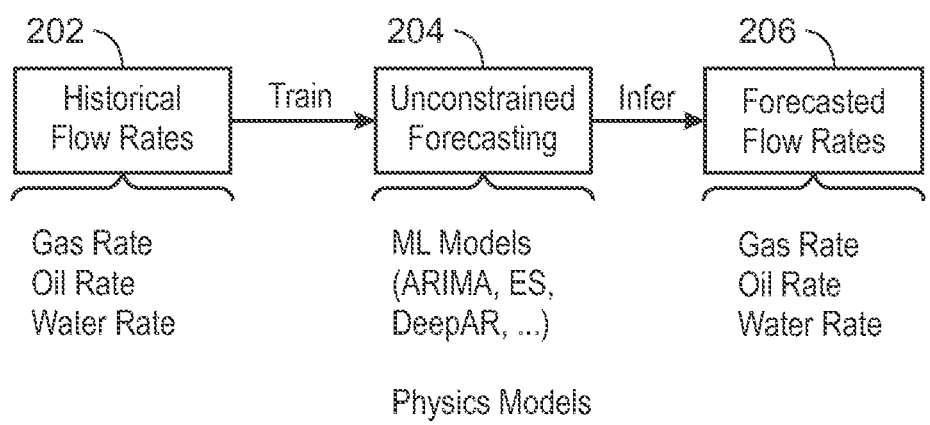
FIG. 2 is a block diagram illustrating an unconstrained flow forecasting model.

FIG. 2 is a block diagram illustrating an unconstrained flow forecasting model 200. The flow model 200 may be, for example, a flow model 102 of FIG. 1. Generally, the flow model 200 enables unconstrained flow forecasting. Unconstrained refers to building the flow models to forecast target flow rates based on flow rate data at present and past time stamps, without constraints from auxiliary data of well dynamics. In the example of FIG. 2, historical flow rates 202 are provided as training data for unconstrained forecasting 204. The historical flow rates 202 include past gas rates, oil rates, and water rates of a well or reservoir. Unconstrained forecasting 204 outputs a forecast of flow rates 206. Unconstrained forecasting 204 is realized using machine learning models trained using historical flow rates. In embodiments, the unconstrained forecasting 204 is based on physics models, machine learning models, or a hybrid of the two. The forecasted flow rates 206 are inferred from the unconstrained forecasting 204. The forecasted flow rates include gas rates, oil rates, and water rates. In some examples, additional post-processing steps, such as smoothing are applied to the forecasted flow rates.

In the example of FIG. 2, one or multiple models are built to forecast the gas/oil/water multi-phase flow rates produced by a well or reservoir, without constraints from auxiliary data or well dynamics (for example, well dynamics model 104 of FIG. 1). The flow forecasting models 200 are trained from historical flow rates 202 of each individual target flow (for example, gas rate, oil rate, water rate), or a combination of selected flows, or all flows. The modeling approach can be based on physics models, machine learning models, or a combination of physics models and machine learning models. In examples, the unconstrained forecasting 204 is based on modeling technology such as Auto Regressive Integrated Moving Average (ARIMA) and its variants, exponential smoothing, DeepAR, and the like. For example, the model can be expressed as ARIMA(p, D, q), where the parameters p, D and q denote the structure of the forecasting model, which is a combination of auto-regression AR(p), moving average MA(q) and differencing degree D. The mathematical formula of the ARIMA (p, D, q) can be described as formula below.

$$\left(1 - \sum_{i=1}^{p} \varphi_i L^i\right)(1-L)^D \chi_t = \left(1 + \sum_{i=1}^{q} \theta_i L^i\right) \epsilon_t$$

Where L denotes the lag operator, $\varphi_i$ are the parameters of the autoregressive part of the model, $\theta_i$ are the parameters of the MA part, and $\epsilon_t$ are error terms.

Figure 3:
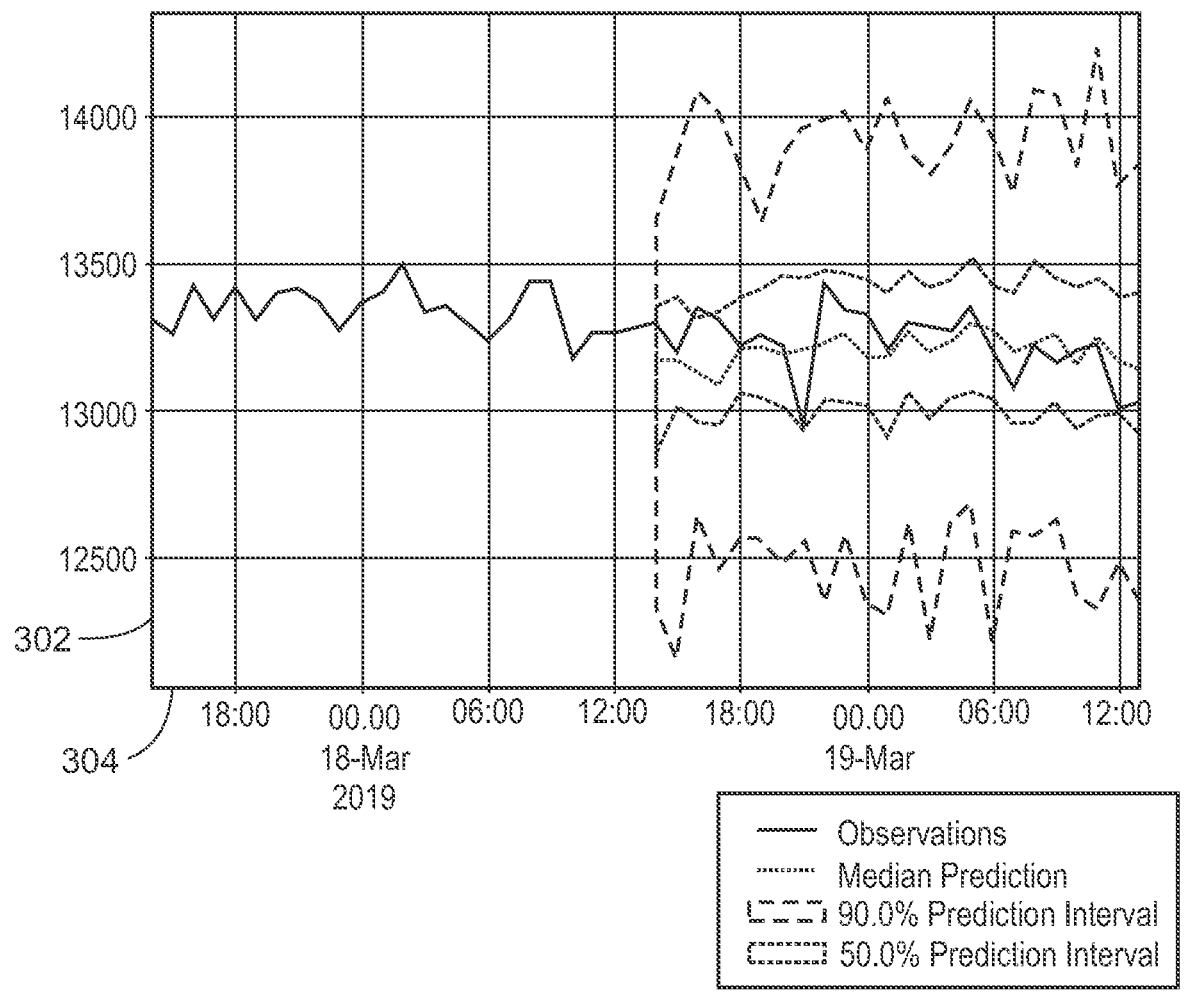
FIG. 3 is an illustration of flow rate production over time.

The trained models are then inferred on a future time from the training time period to predict the unconstrained target flow rates. In some embodiments, machine learning models (for example ARIMA) enable additional forecasting information associated with the flow rates, such as a prediction of confidence in user-defined intervals. An example of flow rate prediction from the unconstrained flow forecasting model is shown in FIG. 3. FIG. 3 is graph 300 illustrating flow rate production over time. The y-axis 302 provides flow rates while the x-axis 304 provides time.

The block diagram of FIG. 2 is not intended to indicate that the flow model 200 is to include all of the components shown in FIG. 2. Rather, the flow model 200 can include fewer or additional components not illustrated in FIG. 2 (for example, additional flow rates, forecasting, and the like). The flow model 200 may include any number of additional components not shown, depending on the details of the specific implementation. Furthermore, any of the functionalities of the flow model 200 may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 4:
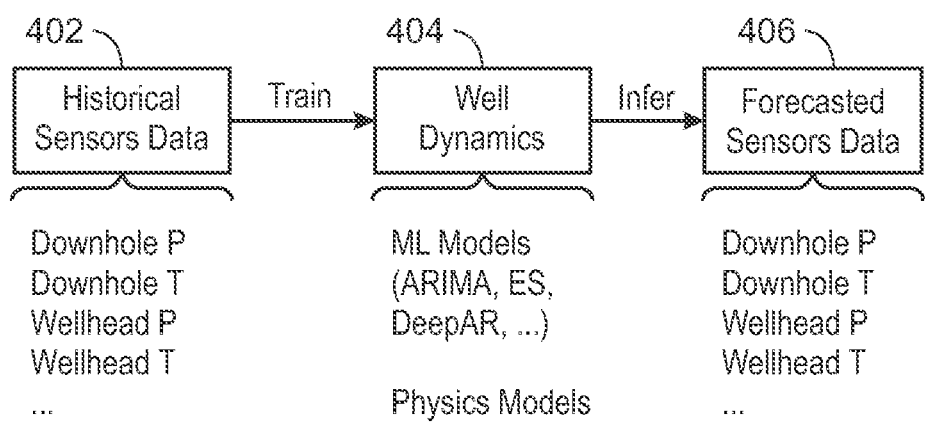
FIG. 4 is a block diagram illustrating a well dynamics forecasting model.

FIG. 4 is a block diagram illustrating a well dynamics forecasting model 400. The well dynamics forecasting model 400 may be, for example, a well dynamics model 104 of FIG. 1. Generally, the well dynamics model 104 enables well dynamics forecasting. In the example of FIG. 4, historical sensor data 402 are provided as training data for a well dynamics forecasting model 404. The historical sensor data 402 include downhole pressure, downhole temperature, wellhead pressure, and wellhead temperature. The well dynamics forecasting model 404 is realized using machine learning models trained using historical sensor data 402. In embodiments, the well dynamics forecasting 404 is based on physics models, machine learning models, or a hybrid of the two. The forecasted sensor data 206 is inferred from the well dynamics forecasting 404. The forecasted sensor data include same sensors types as training data, for example, downhole pressure, downhole temperature, wellhead pressure, and wellhead temperature.

In the example of FIG. 4, one or multiple models are built to forecast the auxiliary sensor data that represent well dynamics. As used herein, well dynamics refers to data that characterizes physical conditions at a well. Instead of direct measurement of flow rates, the well dynamics model is a collection of well characteristics, such as downhole pressure, downhole temperature, wellhead pressure, wellhead temperature, and the like. In some examples, any sensors available that are related to the well characteristics can be modeled. The forecasting models are trained from historical sensor data 402 of one or more individual target sensors, or a combination of selected sensors, or all sensors. The modeling approach can be based on physics models, machine learning models, or combination of physics models and machine learning models. A few examples of modeling technology include ARIMA and its variants, exponential smoothing, DeepAR, and the like. For example, the model can be expressed as ARIMA(p, D, q), where the parameters p, D and q denote the structure of the forecasting model, which is a combination of auto-regression AR(p), moving average MA(q) and differencing degree D. The mathematical formula of the ARIMA (p, D, q) can be described as formula below.

$$\left(1 - \sum_{i=1}^{p} \varphi_i L^i\right)(1-L)^D \chi_t = \left(1 + \sum_{i=1}^{q} \theta_i L^i\right) \epsilon_t$$

Where L denotes the lag operator, $\varphi_i$ are the parameters of autoregressive part of the model, $\theta_i$ are the parameters of the MA part, and $\epsilon_t$ are error terms.

The trained models are then inferred on a future time from the training time period to predict the target sensor data. In some embodiments, machine learning models (for example ARIMA) enable additional forecasting information associated with sensor data, such as a prediction of confidence in user-defined intervals.

The block diagram of FIG. 4 is not intended to indicate that the well dynamics forecasting model 400 is to include all of the components shown in FIG. 4. Rather, the well dynamics forecasting model 400 can include fewer or additional components not illustrated in FIG. 4 (for example, additional sensor data, forecasting, and the like). The well dynamics forecasting model 400 may include any number of additional components not shown, depending on the details of the specific implementation. Furthermore, any of the functionalities of the well dynamics forecasting model 400 may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 5:
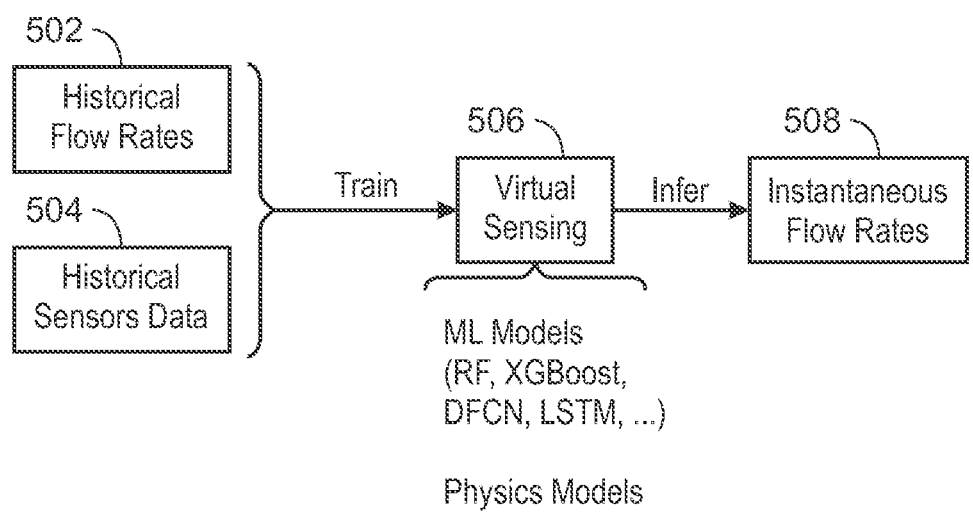
FIG. 5 is a block diagram illustrating a virtual flow metering model.

FIG. 5 is a block diagram illustrating a virtual flow metering model 500. The virtual flow metering model 500 may be, for example, a virtual sensing model 106 of FIG. 1. Generally, the virtual sensing model 106 enables virtual metering. Virtual flow metering measures, in real time, one or more flow rates without data obtained from a direct, physical measurement of the flow rates. In the example of FIG. 5, the virtual sensing model is built to predict the gas/oil/water multi-phase flow rates into the near future using virtual flow metering (VFM). The VFM model 500 is trained from historical sensor data as input features and historical flow rates as ground truth labels. In examples, the historical flow rates are used to label features extracted from the historical sensor data. The modeling approach is a supervised regression, by either physics-driven modeling such as first principle simulation by a dynamic multi-fluid model (for example, OLGA, and the like), data-driven modeling including machine learning models, or a combination of physics driven modeling and data-driven modeling. A few examples of modeling technology include random forest regression, XGBoost regression, deep fully connected network (DFCN) regression, long short-term memory (LSTM) regression, and the like. In the example of FIG. 5, historical flow rates 502 and historical sensor data 504 are provided as training data to virtual sensing models 506. Virtual sensing 506 is realized using machine learning models such as random forest (RF), XGBoost, DFCN, LTSM, and the like. In embodiments, the virtual sensing 506 is based on physics models, machine learning models, or a hybrid of the two. Flow rates 508 are inferred from the virtual sensing 506. The inferred flow rates include oil, water, and gas flow rates.

The block diagram of FIG. 5 is not intended to indicate that the virtual flow metering model 500 is to include all of the components shown in FIG. 5. Rather, the virtual flow metering model 500 can include fewer or additional components not illustrated in FIG. 5 (for example, additional flow rates, sensor data, forecasting, and the like). The virtual flow metering model 500 may include any number of additional components not shown, depending on the details of the specific implementation. Furthermore, any of the functionalities of the virtual flow metering model 500 may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 6:
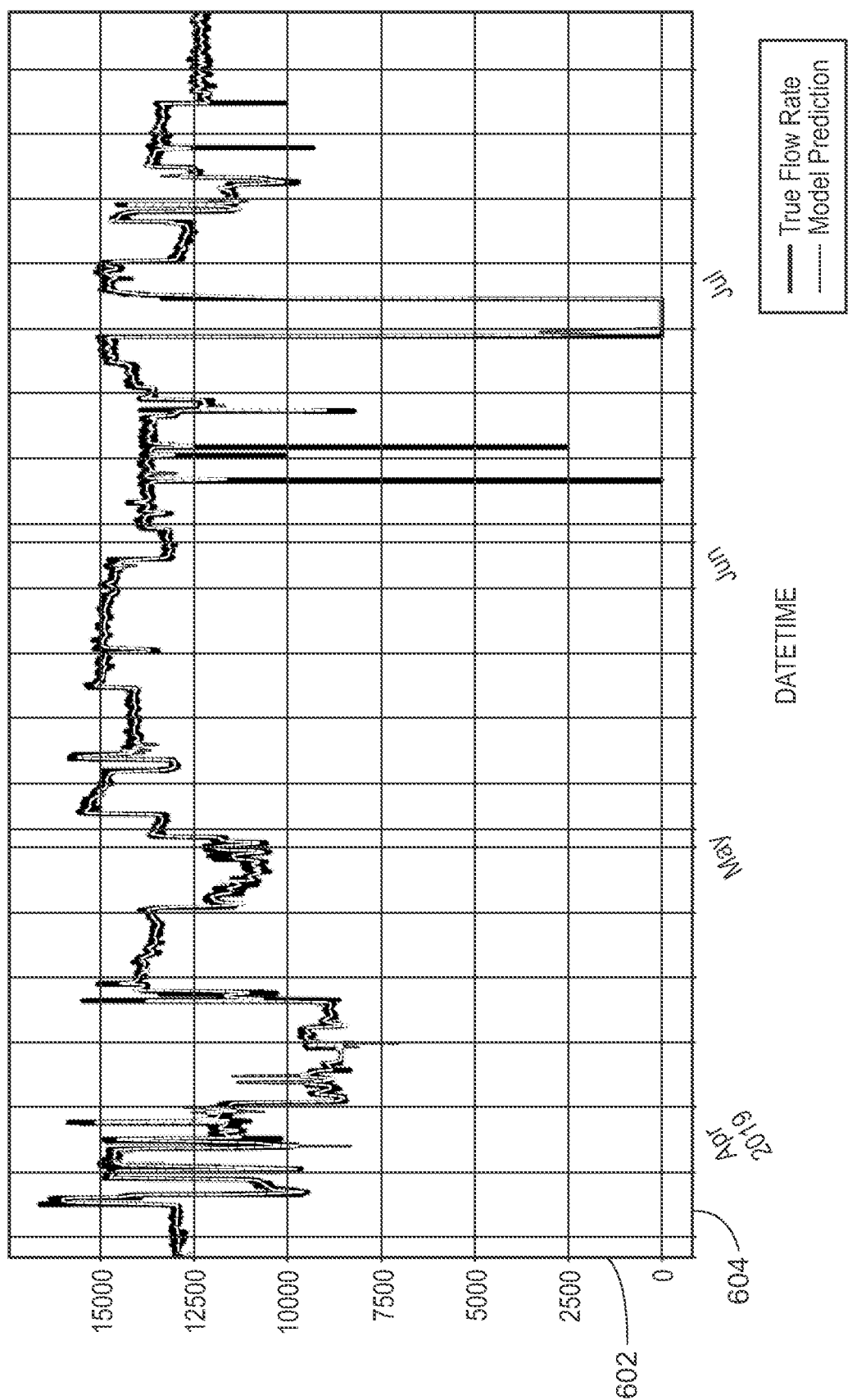
FIG. 6 is an illustration of production flow rate ground truth label and model predictions made using a virtual flow metering model.

FIG. 6 is an illustration of production flow rate 600 ground truth label and model prediction made using a virtual flow metering model (for example, model 500 of FIG. 5). FIG. 6 is an illustration of true flow rates and predicted flow rates over time. The y-axis 602 provides flow rates while the x-axis 604 provides time. In the example of FIG. 6, the trained model (for example, virtual flow metering model 500) represents a correlation model between the multi-phase flow rates and the auxiliary sensors data, and thus reflects the characteristics of the well performance. It is then inferred on a next time stamp, to predict the instantaneous target flow rates. An example of instantaneous flow rate prediction from the virtual flow metering model 500 is shown in FIG. 6.

Figure 7:
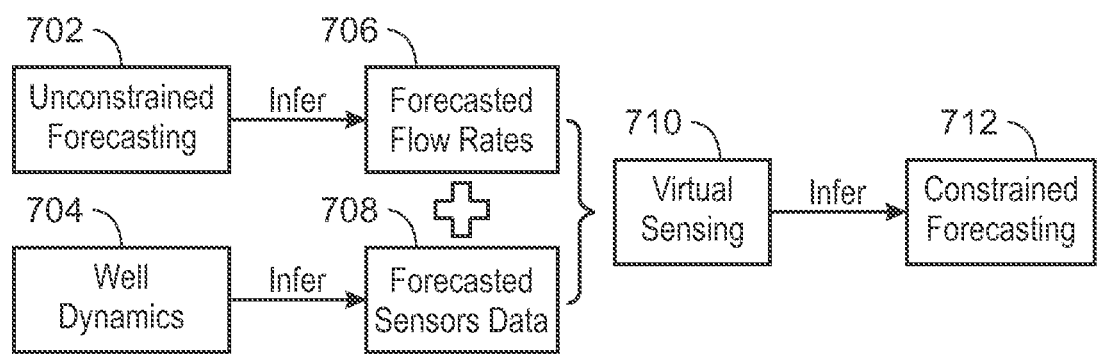
FIG. 7 is a block diagram illustrating model-constrained flow forecasting.

FIG. 7 is a block diagram illustrating a model-constrained flow forecasting model 700. The model-constrained flow forecasting 700 may be, for example, a flow forecasting model 108 of FIG. 1. Generally, the model-constrained flow forecasting model 700 is based on unconstrained forecasting 702 (for example, model 200 of FIG. 2) to generate forecast flow rates 706 and well dynamics 704 (for example, model 400 of FIG. 4) to generate forecast sensor data 708. In the example of FIG. 7, the model-constrained flow forecasting model 700 provides the forecast flow rates 706 and the forecast sensor data 708 as input to trained virtual sensing models 710. Virtual sensing 710 is realized using machine learning models such as random forest (RF), XGBoost, DFCN, LTSM, and the like. In embodiments, the virtual sensing 710 is based on physics models, machine learning models, or a hybrid of the two. Constrained flow rates are inferred from the virtual sensing 710. The inferred constrained flow rates include oil, water, and gas flow rates. In embodiments, the virtually sensed multi-phase flow rates enable constrained forecasting 712 of future multi-phase flow rates as constrained by one or more models.

In the example of FIG. 7, the model-constrained forecasting model 700 is built on top of the other models, i.e. unconstrained flow forecasting models, well dynamics models, and virtual flow metering models, to forecast the gas/oil/water multi-phase flow rates. The outputs of unconstrained flow forecasting models and well dynamics models are combined as input features to the virtual flow metering model. The virtual flow metering model reflects the characteristics of the well performance and constrains the correlation between the forecasted flow rates and sensor data.

The block diagram of FIG. 7 is not intended to indicate that the model-constrained flow forecasting model 700 is to include all of the components shown in FIG. 7. Rather, the model-constrained flow forecasting model 700 can include fewer or additional components not illustrated in FIG. 7 (for example, additional models, sensor data, and the like). The model-constrained flow forecasting model 700 may include any number of additional components not shown, depending on the details of the specific implementation. Furthermore, any of the functionalities of the virtual flow metering model 700 may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 8:
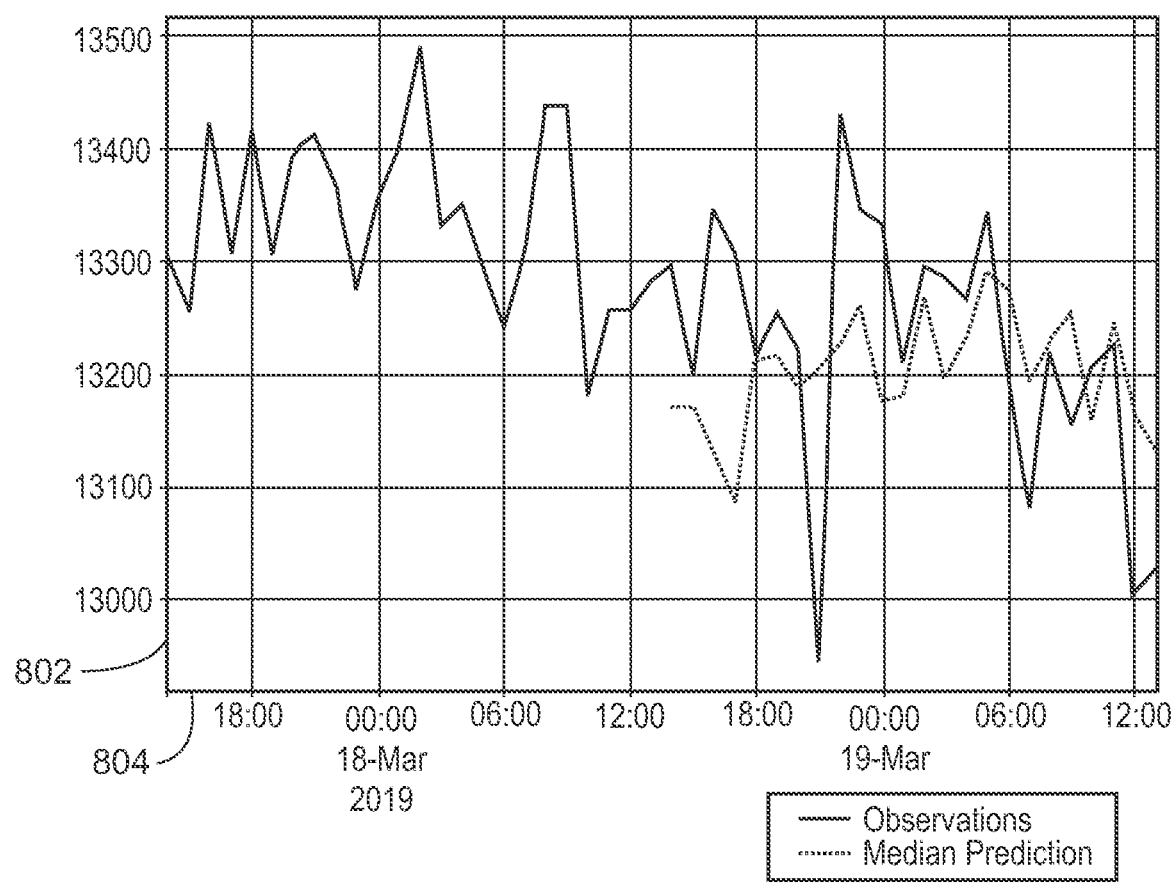
FIG. 8 is an illustration of model-constrained flow forecasting over time.

FIG. 8 is a graph 800 illustrating model-constrained flow forecasting over time. The y-axis 802 provides flow rates while the x-axis 804 provides time. In the example of FIG. 8, the workflow of the model-constrained flow forecasting model 700 is inferred on the future time from the training time period, to predict the target flow rates in a model-constrained manner.

Figure 9:
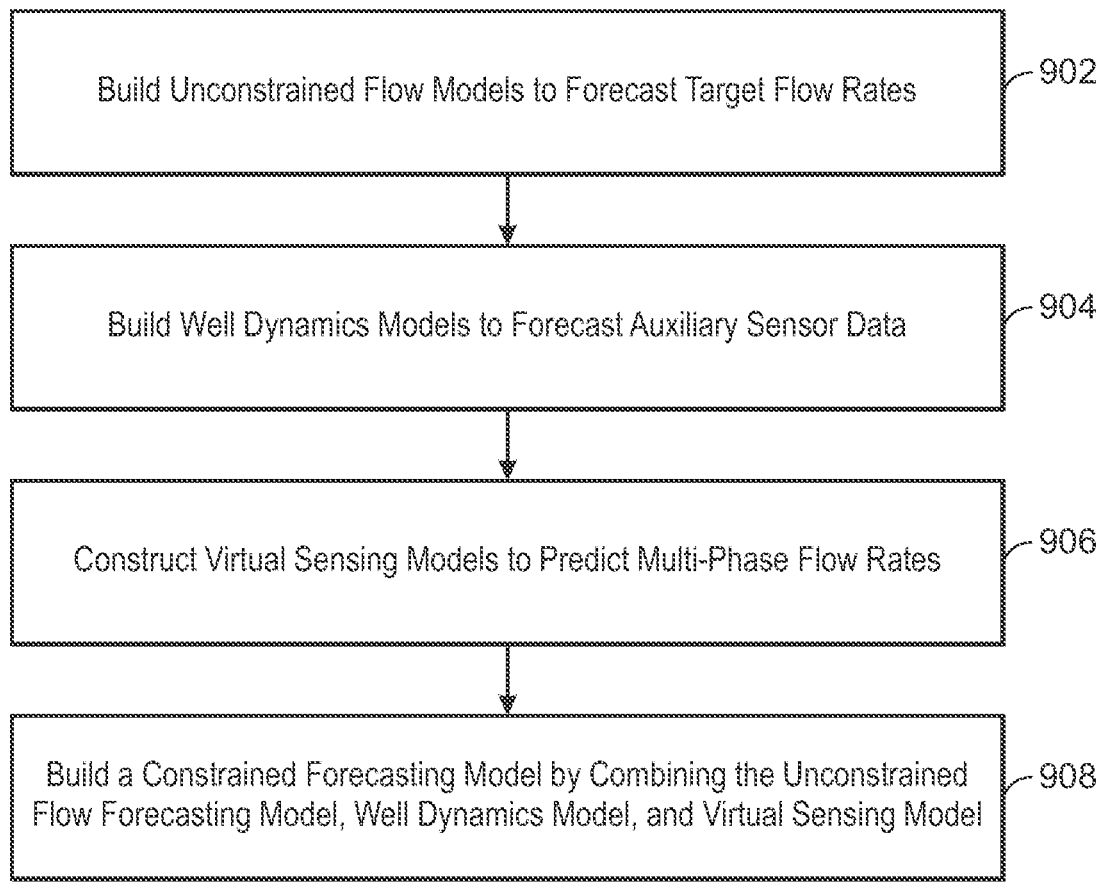
FIG. 9 is a process flow diagram of a process for model-constrained multi-phase virtual flow metering and forecasting with a machine learning approach.

FIG. 9 is a process flow diagram of a process 900 for model-constrained multi-phase virtual flow metering and forecasting with machine learning. The process 900 may include the workflow 100 of FIG. 1. In embodiments, the process 900 is implemented using the controller 1000 of FIG. 10.

At block 902, at least one unconstrained flow model is built to forecast target flow rates based on current and historic multi-phase flow data. At block 904, a well dynamics model is built that captures well dynamics (for example, auxiliary sensor data, target sensor data). Generally, the well dynamics models are independent from the unconstrained flow model, and vice versa. In some use cases, only unconstrained forecasting models are applied. At block 906, a virtual sensing model is constructed to predict the gas/oil/water multi-phase flow rates. At block 906, a constrained forecasting model is built by combining the unconstrained flow forecasting model, well dynamics model, and virtual sensing model.

The process flow diagram of FIG. 9 is not intended to indicate that the process 900 is to include all of the steps shown in FIG. 9. Rather, the process 900 can include fewer or additional components not illustrated in FIG. 9 (for example, additional micro-containers, applications, and the like). The process 900 of FIG. 9 may include any number of additional components not shown, depending on the details of the specific implementation.

Figure 10:
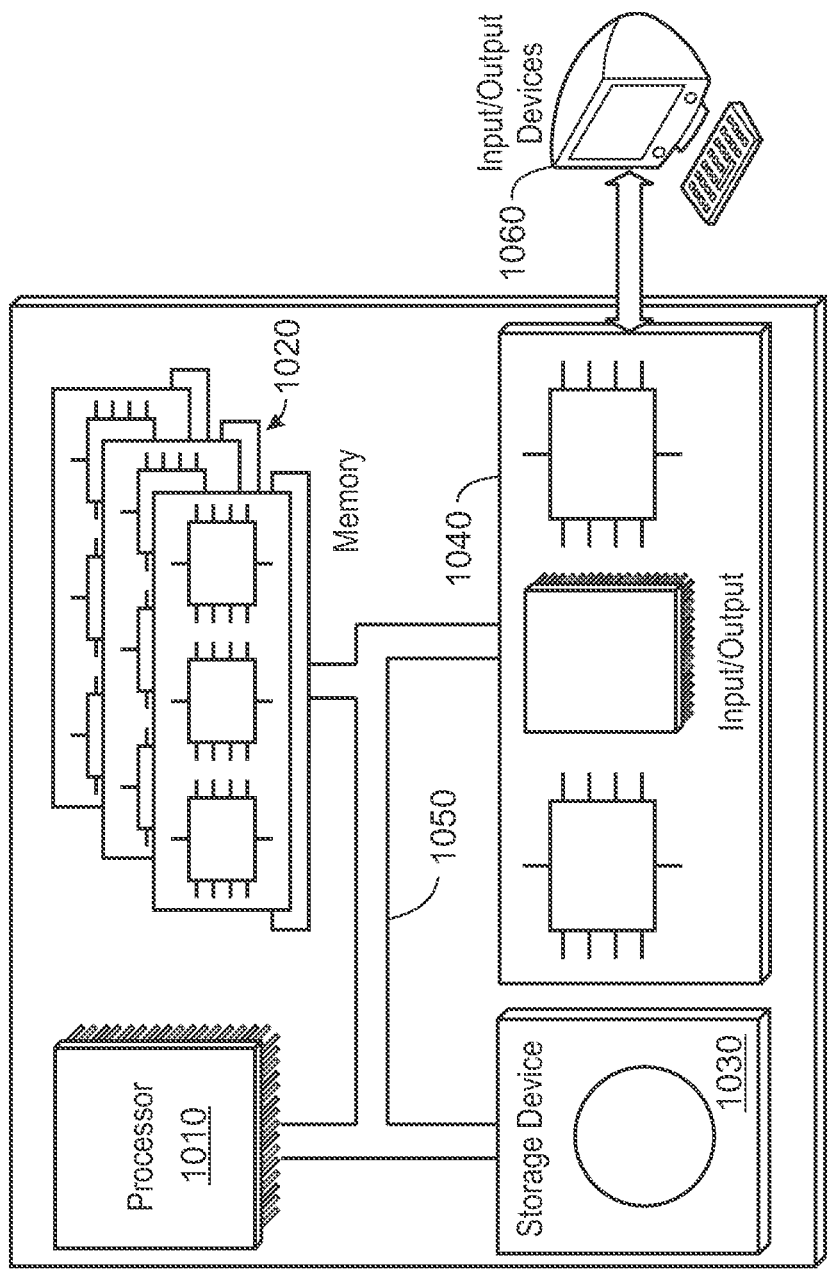
FIG. 10 is a schematic illustration of an example controller (or control system) for model-constrained multi-phase virtual flow metering and forecasting with machine learning according to the present disclosure.

FIG. 10 is a schematic illustration of an example controller 1000 (or control system) for model-constrained multi-phase virtual flow metering and forecasting with machine learning according to the present disclosure. For example, the controller 1000 may be operable according to the workflow 100 of FIG. 1 or the process 900 of FIG. 9. The controller 1000 is intended to include various forms of digital computers, such as printed circuit boards (PCB), processors, digital circuitry, or otherwise parts of a system for supply chain alert management. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 1000 includes a processor 1010, a memory 1020, a storage device 1030, and an input/output interface 1040 communicatively coupled with input/output devices 1060 (for example, displays, keyboards, measurement devices, sensors, valves, pumps). Each of the components 1010, 1020, 1030, and 1040 are interconnected using a system bus 1050. The processor 1010 is capable of processing instructions for execution within the controller 1000. The processor may be designed using any of a number of architectures. For example, the processor 1010 may be a CISC (Complex Instruction Set Computers) processor, a RISC (Reduced Instruction Set Computer) processor, or a MISC (Minimal Instruction Set Computer) processor.

In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output interface 1040.

The memory 1020 stores information within the controller 1000. In one implementation, the memory 1020 is a computer-readable medium. In one implementation, the memory 1020 is a volatile memory unit. In another implementation, the memory 1020 is a nonvolatile memory unit.

The storage device 1030 is capable of providing mass storage for the controller 1000. In one implementation, the storage device 1030 is a computer-readable medium. In various different implementations, the storage device 1030 may be a floppy disk device, a hard disk device, an optical disk device, or a tape device.

The input/output interface 1040 provides input/output operations for the controller 1000. In one implementation, the input/output devices 1060 includes a keyboard and/or pointing device. In another implementation, the input/output devices 1060 includes a display unit for displaying graphical user interfaces.

There can be any number of controllers 1000 associated with, or external to, a computer system containing controller 1000, with each controller 1000 communicating over a network. Further, the terms "client," "user," and other appropriate terminology can be used interchangeably, as appropriate, without departing from the scope of the present disclosure. Moreover, the present disclosure contemplates that many users can use one controller 1000 and one user can use multiple controllers 1000.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network.

Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship. Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

Particular embodiments of the subject matter have been described. Other embodiments are within the scope of the following claims. For example, the actions recited in the claims can be performed in a different order and still achieve desirable results. As one example, some processes depicted in the accompanying figures do not necessarily require the particular order shown, or sequential order, to achieve desirable results.

What is claimed is:

1. A computer-implemented method for model constrained multi-phase virtual flow metering and forecasting, the method comprising:
    forecasting, with one or more hardware processors, target flow rates for real-time monitoring using unconstrained flow models trained using current and historic multi-phase flow rates;
    forecasting, with the one or more hardware processors, auxiliary sensor data for real-time monitoring using trained well dynamics models;
    constructing, with the one or more hardware processors, at least one virtual sensing model trained using the forecast target flow rates and the forecast auxiliary sensor data, wherein the at least one virtual sensing model predicts real-time constrained multi-phase flow rates; and
    monitoring, with the one or more hardware processors, the predicted real-time constrained multi-phase flow rates output by the at least one virtual sensing model of a virtual flow metering system that enables production planning based on the real-time constrained multi-phase flow rates.

2. The computer-implemented method of claim 1, comprising combining the trained unconstrained flow models, the trained well dynamics models, and the at least one trained virtual sensing model by providing outputs of the trained unconstrained flow forecasting models and the trained well dynamics models as input features to the at least one trained virtual sensing model.

3. The computer-implemented method of claim 1, wherein the unconstrained flow models are trained from historical flow rates of each individual target flow, or a combination of selected or all flows.

4. The computer-implemented method of claim 1, wherein the unconstrained flow models are based on physics models, machine learning models, or any combinations thereof.

5. The computer-implemented method of claim 1, wherein the well dynamics models are trained using historical sensor data.

6. The computer-implemented method of claim 1, wherein the at least one trained virtual sensing model predicts instantaneous multi-phase flow rates based on historical flow rates and sensor data.

7. The computer-implemented method of claim 1, wherein the virtual flow metering system enables virtual flow metering that predicts constraint flow rates as a function of time.

8. An apparatus comprising a non-transitory, computer readable, storage medium that stores instructions that, when executed by at least one processor, cause the at least one processor to perform operations comprising:
predicting target flow rates for real time monitoring using unconstrained flow models trained using current and historic multi-phase flow rates;
predicting future auxiliary sensor data for real-time monitoring using trained well dynamics models;
constructing at least one virtual sensing model trained using predicted target flow rates and predicted auxiliary sensor data, wherein the at least one virtual sensing model predicts real-time constrained multi-phase flow rates; and
monitoring the predicted real-time constrained multi-phase flow rates output by the at least one virtual sensing model of a virtual flow metering system that enables production planning based on the real-time constrained multi-phase flow rates.

9. The apparatus of claim 8, comprising combining the trained unconstrained flow models, the trained well dynamics models, and the at least one trained virtual sensing model by providing outputs of the trained unconstrained flow forecasting models and the trained well dynamics models as input features to the at least one trained virtual sensing model.

10. The apparatus of claim 8, wherein the unconstrained flow is models are trained from historical flow rates of each individual target flow, or a combination of selected or all flows.

11. The apparatus of claim 8, wherein the unconstrained flow is models are based on physics models, machine learning models, or any combinations thereof.

12. The apparatus of claim 8, wherein the well dynamics models are trained using historical sensor data.

13. The apparatus of claim 8, wherein the at least one trained virtual sensing model predicts instantaneous multi-phase flow rates based on historical flow rates and sensor data.

14. The apparatus of claim 8, wherein the virtual flow metering system enables virtual flow metering that predicts constraint flow rates as a function of time.

15. A system, comprising:
one or more memory modules;
one or more hardware processors communicably coupled to the one or more memory modules, the one or more hardware processors configured to execute instructions stored on the one or more memory models to perform operations comprising:
predicting target flow rates for real-time monitoring using unconstrained flow models trained using current and historic multi-phase flow rates;
predicting auxiliary sensor data for real-time monitoring using trained well dynamics models;
constructing at least one virtual sensing model trained using the predicted target flow rates and the predicted auxiliary sensor data, wherein the at least one virtual sensing model predicts real-time constrained multi-phase flow rates; and
monitoring the predicted real-time constrained multi-phase flow rates output by the at least one virtual sensing model of a virtual flow metering system that enables production planning based on the real-time constrained multi-phase flow rates.

16. The system of claim 15, comprising the operations comprise combining the trained unconstrained flow models, the trained well dynamics models, and the at least one trained virtual sensing model by providing outputs of the trained unconstrained flow forecasting models and the trained well dynamics models as input features to the at least one trained virtual sensing model.

17. The system of claim 15, wherein the operations comprise training the unconstrained flow models from historical flow rates of each individual target flow, or a combination of selected or all flows.

18. The system of claim 15, wherein the operations comprise generating the unconstrained flow models based on physics models, machine learning models, or any combinations thereof.

19. The system of claim 15, wherein the well dynamics models are trained using historical sensor data.

20. The system of claim 15, wherein the at least one trained virtual sensing model predicts instantaneous multi-phase flow rates based on historical flow rates and sensor data.

* * * * *

UNITED STATES PATENT AND TRADEMARK OFFICE
CERTIFICATE OF CORRECTION

PATENT NO. : 12,085,687 B2
APPLICATION NO. : 17/571907
DATED : September 10, 2024
INVENTOR(S) : Tao Lin et al.

It is certified that error appears in the above-identified patent and that said Letters Patent is hereby corrected as shown below:

In the Claims

In Column 15, Line 11, Claim 8, please replace "predicting future" with -- predicting --.

In Column 15, Line 31, Claim 10, please replace "is models" with -- models --.

In Column 15, Line 35, Claim 11, please replace "is models" with -- models --.

Signed and Sealed this
Twelfth Day of November, 2024

Katherine Kelly Vidal
*Director of the United States Patent and Trademark Office*